(12) United States Patent
Zheng et al.

(10) Patent No.: US 11,871,176 B2
(45) Date of Patent: Jan. 9, 2024

(54) FAR-FIELD PICKUP DEVICE AND METHOD FOR COLLECTING VOICE SIGNAL IN FAR-FIELD PICKUP DEVICE

(71) Applicant: TENCENT TECHNOLOGY (SHENZHEN) COMPANY LTD, Guangdong (CN)

(72) Inventors: Ji Meng Zheng, Shenzhen (CN); Meng Yu, Shenzhen (CN); Dan Su, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 700 days.

(21) Appl. No.: 17/032,278

(22) Filed: Sep. 25, 2020

(65) Prior Publication Data

US 2021/0021925 A1   Jan. 21, 2021

Related U.S. Application Data

(63) Continuation of application No. PCT/CN2019/108166, filed on Sep. 26, 2019.

(30) Foreign Application Priority Data

Sep. 29, 2018 (CN) .......................... 201811150947.5

(51) Int. Cl.
*H04R 1/20* (2006.01)
*G10L 15/20* (2006.01)
*H04R 3/12* (2006.01)

(52) U.S. Cl.
CPC ................ *H04R 1/20* (2013.01); *G10L 15/20* (2013.01); *H04R 3/12* (2013.01)

(58) Field of Classification Search
CPC . H04R 1/20; H04R 3/12; H04R 1/406; H04R 3/005; H04R 2430/00; G10L 15/20; G10L 25/78; H04M 9/082
See application file for complete search history.

(56) References Cited

U.S. PATENT DOCUMENTS 9,668,053 B1 * 5/2017 Rivera .................... H04R 3/12
10,546,581 B1 * 1/2020 Gejji ................... G10L 21/0208
(Continued)

FOREIGN PATENT DOCUMENTS

CN          104157293 A     11/2014
CN          105304093 A      2/2016
(Continued)

OTHER PUBLICATIONS

Written Opinion of the International Searching Authority dated Dec. 27, 2019 in International Application No. PCT/CN2019/108166.
(Continued)

*Primary Examiner* — Michael Colucci
(74) *Attorney, Agent, or Firm* — Sughrue Mion, PLLC

(57) ABSTRACT

A far-field pickup device including a device body and a microphone pickup unit is provided. The microphone pickup unit is configured to collect user speech and an echo of a first sound signal output by the device body, and transmit, to the device body, a signal obtained through digital conversion of the collected user speech and the echo. The device body includes a signal playback source, a synchronizing signal generator, a horn, a delay determining unit, and an echo cancellation unit configured to perform echo cancellation on the signal transmitted by the microphone pickup unit to obtain a collected human voice signal.

20 Claims, 21 Drawing Sheets

(56) References Cited

U.S. PATENT DOCUMENTS

| | | | | |
|---|---|---|---|---|
| 11,605,393 | B2* | 3/2023 | Mitic | ............... H04S 7/305 |
| 2003/0229490 | A1* | 12/2003 | Etter | ............... G10L 21/04 |
| | | | | 704/211 |
| 2008/0247557 | A1* | 10/2008 | Sudo | ............... H04M 9/082 |
| | | | | 381/66 |
| 2008/0317241 | A1* | 12/2008 | Wang | ............... H04M 9/082 |
| | | | | 379/406.11 |
| 2010/0107856 | A1 | 5/2010 | Hetherington et al. | |
| 2015/0208956 | A1* | 7/2015 | Schmitt | ............ A61B 5/123 |
| | | | | 600/559 |
| 2015/0371654 | A1* | 12/2015 | Johnston | ......... G10L 21/0208 |
| | | | | 381/66 |
| 2019/0251983 | A1* | 8/2019 | Lin | ............... G10L 21/0208 |

FOREIGN PATENT DOCUMENTS

| | | |
|---|---|---|
| CN | 107454508 A | 12/2017 |
| CN | 110166882 A | 8/2019 |

OTHER PUBLICATIONS

Extended European Search Report dated Mar. 15, 2022 in European Application No. 19866344.5.
International Search Report for PCT/CN2019/108166 dated Dec. 27, 2019 [PCT/ISA/210].

* cited by examiner

FAR-FIELD PICKUP DEVICE AND METHOD FOR COLLECTING VOICE SIGNAL IN FAR-FIELD PICKUP DEVICE

CROSS-REFERENCE TO RELATED APPLICATION(S)

This application is a bypass continuation application of International Application No. PCT/CN2019/108166, filed on Sep. 26, 2019, which claims priority to Chinese Patent Application No. 201811150947.5, entitled "FAR-FIELD PICKUP DEVICE AND METHOD FOR COLLECTING HUMAN VOICE SIGNAL IN FAR-FIELD PICKUP DEVICE", and filed with the National Intellectual Property Administration, PRC on Sep. 29, 2018, the disclosures of which are herein incorporated by reference in their entireties.

FIELD

The disclosure relates to the field of electronic devices, and in particular, to a far-field pickup device, a method and apparatus for collecting a human voice signal in a far-field pickup device, an electronic device, and a storage medium.

BACKGROUND

Artificial Intelligence (AI) is based on a digital computer or a machine controlled by the digital computer to simulate, extend, and expand human intelligence, perceive the environment, acquire knowledge, and use knowledge. In other words, AI is a comprehensive technology of computer science, which attempts to understand essence of intelligence and produces a new intelligent machine that responds in a manner similar to human intelligence. AI studies design principles and implementation methods of various intelligent machines so that the intelligent machines have the functions of perception, reasoning, and decision-making.

The AI technology is a comprehensive discipline, covering a wide range of fields including both the hardware-level technology and the software-level technology. The basic AI technology generally includes a technology such as a sensor, a dedicated AI chip, cloud computing, distributed storage, big data processing technologies, operation/interaction systems, mechatronics, or the like. An AI software technology mainly includes fields such as a computer vision technology, a speech processing technology, a natural language processing technology, machine learning/deep learning, and the like.

Key technologies of the speech technology include an automatic speech recognition (ASR) technology, a text-to-speech (TTS) technology, and a voiceprint recognition technology. To provide to a computer a capability to listen, see, speak, and feel (or express emotions) is the future development direction of human-computer interaction, and speech is expected to become one of the most promising human-computer interaction methods in the future.

A smart speaker can recognize a speech command transmitted by a user, such as "turn up the volume" during the playback, and then perform an action in accordance with the speech command of the user, such as "turn up the volume". In the smart speaker, a microphone can pick up a sound signal in the environment, including user speech, interference noise in the environment, an echo of the sound signal played by the smart speaker, and the like. The sound signal collected by the microphone is converted into digital information and transmitted to a speech signal pre-processing module. The speech signal pre-processing module mainly has two tasks. First, an echo cancellation algorithm is used for removing or reducing the echo of the sound signal played by the smart speaker itself picked up by the microphone, that is, when a playback signal source generates a speech signal to be played, the speech signal pre-processing module extracts an echo reference signal from the generated voice signal. A mixed signal that is picked up by the microphone may include the user speech, the interference noise in the environment, and the echo of the sound signal played by the smart speaker. After the mixed signal is received, the echo reference signal is used for cancelling the echo in the mixed signal. Second, a noise cancellation algorithm such as beamforming is used for reducing interference noise in the environment.

In the smart speaker, a horn and the microphone are often integrated on a main body of the smart speaker. A distance between the microphone and the horn is very small, causing the echo of the sound signal played by the smart speaker itself and received by the microphone to be prone to clipping and saturation, resulting in a significant decrease in the performance of the echo cancellation algorithm. In addition, because the horn and microphone are integrated on the main body, the user is far away from the microphone. In this case, if the interference noise in the environment is large, or reverberations of the room is large, input signal noise of the microphone will be relatively low, which will result in a decrease in gains provided by the noise cancellation algorithm such as beamforming and a decrease in the speech recognition performance. However, if the reverberations in the room are small, the loss of a high-frequency component of the user speech will be large in a transmission process, which will also deteriorate the speech recognition performance.

In order to solve the foregoing problems, a separate far-field pickup solution is provided in the related art. That is, the microphone is arranged alone separate from the main body on which the horn is located, and the sound signal picked up by the microphone is transmitted to the main body wirelessly or in other means for pre-processing of the speech signal. Because the distance between the microphone and the horn becomes larger, the echo of the sound signal played by the smart speaker itself and received by the microphone will not be clipped and saturated. Moreover, the user becomes closer to the microphone, which can improve the speech recognition performance. However, because the distance between the microphone and the main body is variable, the sound signal of the microphone and the echo reference signal received by the main body cannot be synchronized, which results in a decrease in the application performance of the echo cancellation algorithm. In addition, the related art far-field pickup device has high power consumption.

SUMMARY

One or more example embodiments of the disclosure provide a far-field pickup device, a method and an apparatus for collecting a human voice signal in a far-field pickup device, an electronic device, and a storage medium, to resolve the problem that a sound signal of a microphone and an echo reference signal cannot be synchronized, thereby improving speech recognition performance.

According to an aspect of an example embodiment, provided is a far-field pickup device, including:

a device body; and a microphone pickup unit including at least one microphone, the at least one microphone configured to collect user speech and an echo of a first sound signal output by the device body, and the microphone pickup unit configured to transmit, to the device body, a signal obtained through digital conversion of the collected user speech and the echo, the device body including: a signal playback source configured to generate a second sound signal;
a synchronizing signal generator, implemented by the at least one processor, configured to generate a synchronizing signal that is synchronized with the second sound signal and located in a second frequency band different from a first frequency band in which the second sound signal is located;
a horn configured to output a signal obtained by superimposing the second sound signal with the synchronizing signal, the signal output by the horn corresponding to the first sound signal;
a delay determining unit, implemented by the at least one processor, configured to determine a time delay between a second frequency band component in the signal transmitted by the microphone pickup unit and the synchronizing signal; and
an echo cancellation unit, implemented by the at least one processor, configured to perform echo cancellation on the signal transmitted by the microphone pickup unit, by using the second sound signal delayed according to the determined time delay, to obtain a collected human voice signal.

According to an aspect of an example embodiment, provided is a method for collecting a human voice signal in a far-field pickup device, the far-field pickup device including a device body and a microphone pickup unit, the microphone pickup unit including at least one microphone, the method including:

generating, by the device body, a synchronizing signal that is synchronized with a first sound signal and in a second frequency band different from a first frequency band in which the first sound signal is located;
outputting, by the device body, a second sound signal based on the synchronizing signal and the first sound signal together;
receiving, by the device body, an echo of the second sound signal output by the device body and user speech that are collected by the microphone pickup unit, and a signal obtained through digital conversion of the collected user speech and the echo;
determining, by the device body, a time delay between a second frequency band component in the signal transmitted by the microphone pickup unit and the synchronizing signal; and
performing, by the device body, echo cancellation on the signal transmitted by the microphone pickup unit, by using the first sound signal delayed according to the determined time delay, to obtain a collected human voice signal.

According to an aspect of an example embodiment, provided is an apparatus for collecting a human voice signal in a far-field pickup device, including:

at least one memory configured to store program code; and
at least one processor configured to read the program code and operate as instructed by the program code, the program code including:
synchronizing signal generating code configured to cause at least one of the at least one processor to generate a synchronizing signal that is synchronized with a first sound signal and located in a second frequency band different from a first frequency band in which the first sound signal is located;
playback code configured to cause at least one of the at least one processor to output the synchronizing signal and the first sound signal together;
receiving code configured to cause at least one of the at least one processor to receive an echo of a second sound signal output by a device body of the far-field pickup device and user speech that are collected by a microphone pickup unit, the microphone pickup unit including at least one microphone, and a signal obtained through digital conversion of the collected user speech and the echo;
determining code configured to cause at least one of the at least one processor to determine a time delay between a second frequency band component in a signal transmitted back by the microphone pickup unit and the synchronizing signal; and
signal obtaining code configured to cause at least one of the at least one processor to perform echo cancellation on the signal transmitted by the microphone pickup unit, by using the first sound signal delayed according to the determined time delay, to obtain a collected human voice signal.

According to an aspect of an example embodiment, provided is an electronic device, including at least one processing unit and at least one storage unit, the at least one storage unit storing a computer-readable program instruction, which, when executed by the processing unit, causes the processing unit to perform the operations of the foregoing method.

According to an aspect of an example embodiment, provided is a non-transitory computer-readable storage medium, storing a computer-readable program instruction executable by at least one processor to perform the operations of the foregoing method.

BRIEF DESCRIPTION OF THE DRAWINGS

The above and other objectives, features, and advantages of the disclosure will become more apparent from the detailed description of example embodiments of the disclosure with reference to the accompanying drawings.

DETAILED DESCRIPTION

Figure 1A:
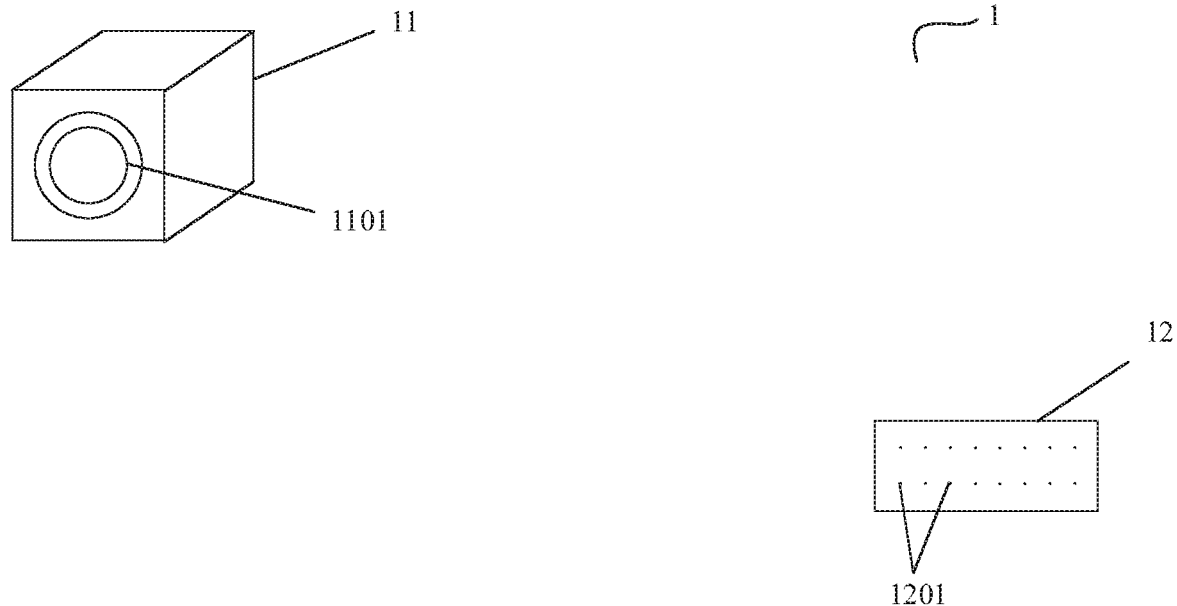
FIG. 1A is a schematic diagram of a scenario in which a far-field pickup device is applied to a smart speaker according to an embodiment of the disclosure.

Examples of implementations of the disclosure are described comprehensively with reference to the accompanying drawings. However, the examples of implementations may be implemented in various multiple forms, and the disclosure should not be construed as being limited to the examples described herein. Conversely, the examples of implementations are provided to make the technical solution of the disclosure more comprehensive and complete, and comprehensively convey the idea of the examples of the implementations to a person skilled in the art. The accompanying drawings are merely example illustrations of the disclosure and are not necessarily drawn to scale. A same reference numeral in the accompanying drawings represents same or similar components, and therefore repeated descriptions of the components are omitted.

In addition, the features, structures, or characteristics described in the disclosure may be combined in one or more examples of implementations in any appropriate manner. In the following description, specific details are provided to enable a person of ordinary skill in the art to fully understand the examples of implementations of the disclosure. However, a person of ordinary skill in the art should be aware that the technical solutions in the disclosure may be implemented without one or more of the particular details, or another method, unit, or step may be used. In other cases, well-known structures, methods, implementations, or operations are not shown or described in detail, in order not to obscure the aspects of the disclosure.

Some block diagrams shown in the accompany drawings are functional entities and do not necessarily correspond to physically or logically independent entities. Such functional entities may be implemented in the form of software, or implemented in one or more hardware modules or integrated circuits, or implemented in different networks and/or processor apparatuses and/or microcontroller apparatuses.

With the research and progress of artificial intelligence (AI) technologies, the AI technology has been researched and applied in various fields, such as a common smart home, a smart wearable device, a virtual assistant, a smart speaker, smart marketing, unmanned driving, automatic driving, an unmanned aerial vehicle, a robot, smart medical care, smart customer service, and the like. With the development of technologies, the AI technology will be applied in more fields and play an increasingly important role. The solutions provided in the embodiments of the disclosure relate to technologies such as the smart speaker of AI, which are specifically described by using the following embodiments.

Figure 1B:
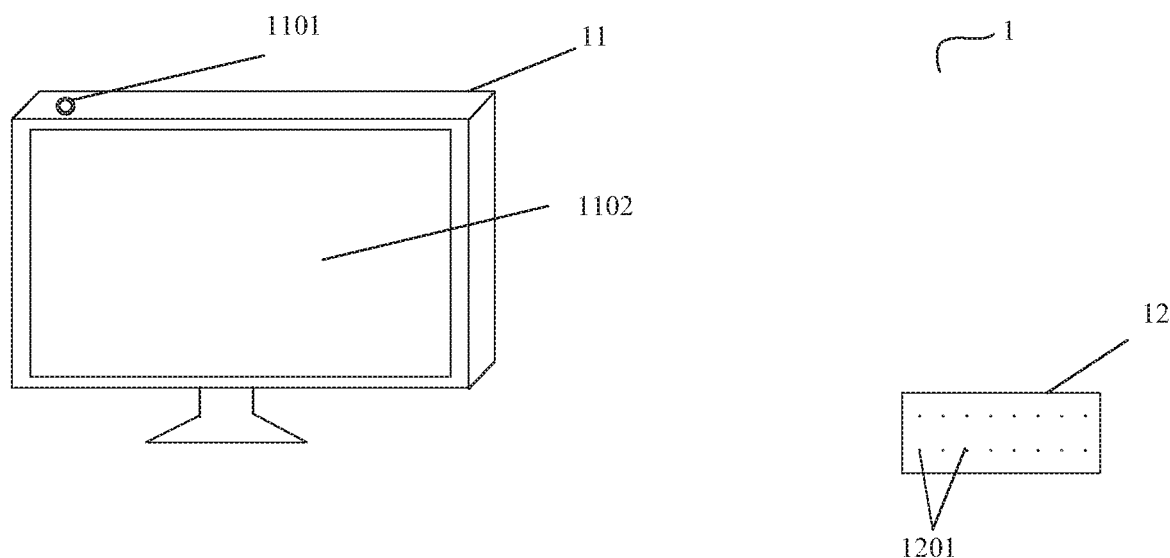
FIG. 1B is a schematic diagram of a scenario in which a far-field pickup device is applied to a smart television according to an embodiment of the disclosure.
Figure 1C:
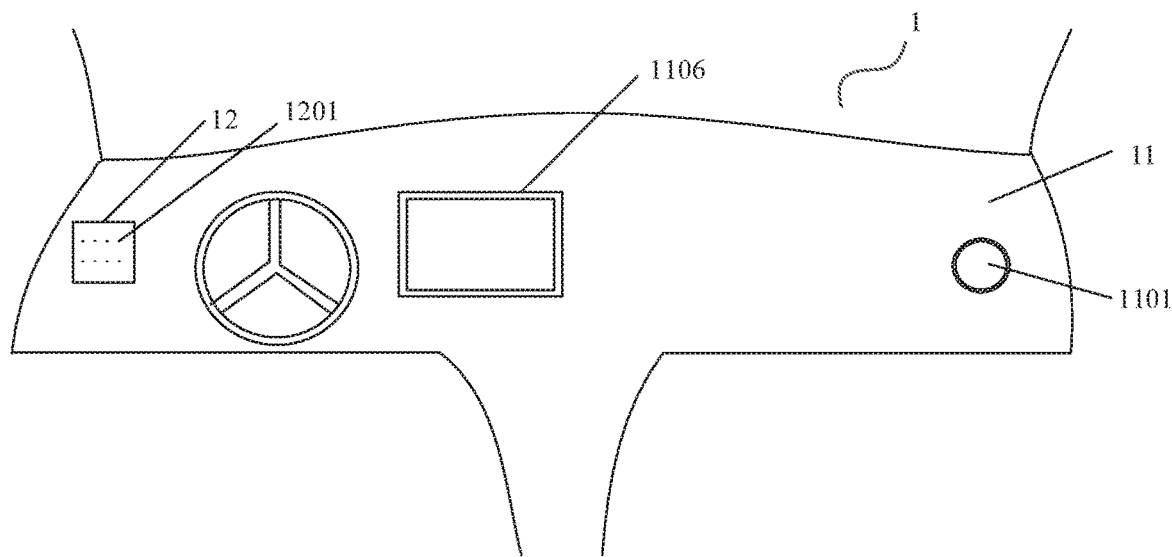
FIG. 1C is a schematic diagram of a scenario in which a far-field pickup device is applied to voice-activated intelligent navigation according to an embodiment of the disclosure.
Figure 1D:
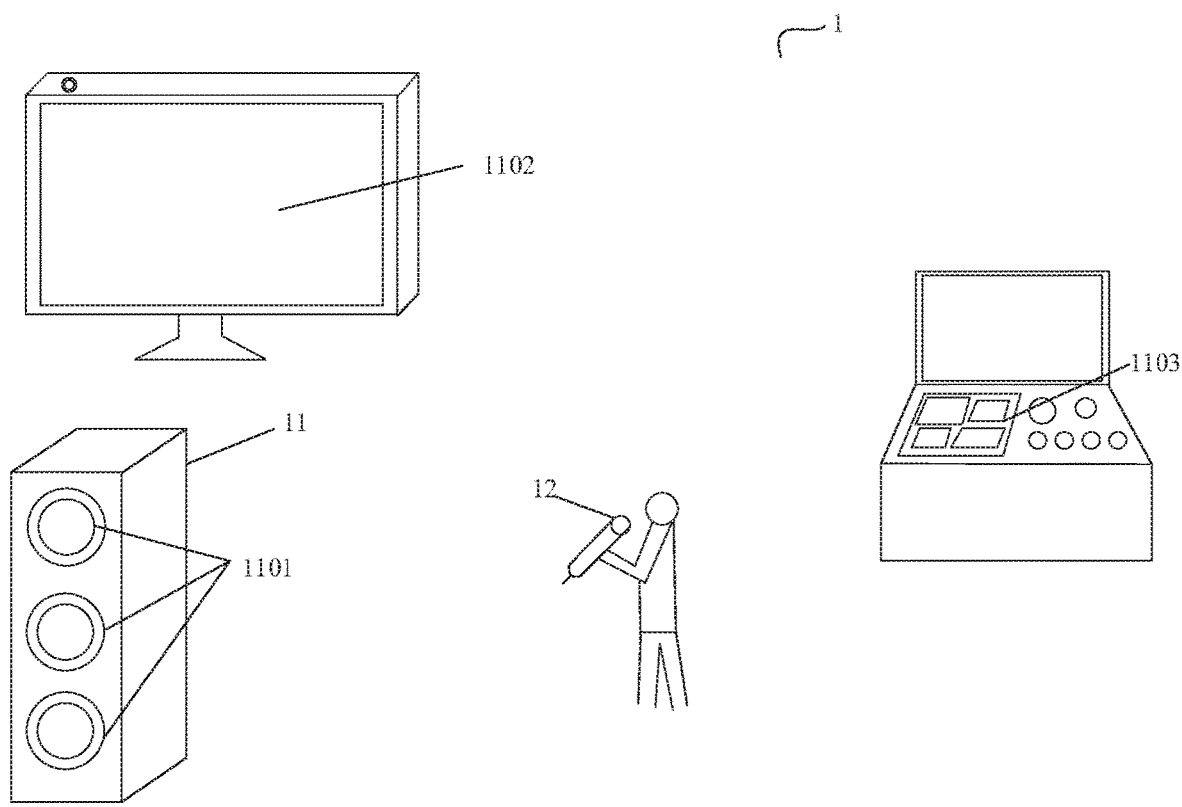
FIG. 1D is a schematic diagram of a scenario in which a far-field pickup device is applied to a KTV (karaoke television) music playback system according to an embodiment of the disclosure.

FIG. 1A to FIG. 1D are each a schematic diagram of four application scenarios of a far-field pickup device according to an embodiment of the disclosure. It would be understood by a person skilled in the art that, while FIG. A to FIG. 1D are used as examples to describe four application scenarios of the far-field pickup device according to an embodiment of the disclosure, the embodiments of the disclosure are not limited to these four application scenarios. A person skilled in the art can benefit from the teachings of the disclosure and apply the far-field pickup device according to the embodiments of the disclosure to various other scenarios.

The far-field pickup device is a device whose microphone is arranged alone separate from a main body on which a horn is located. A sound signal picked up by the microphone is transmitted to the main body wirelessly or in other means for pre-processing of a speech signal. An advantage of the far-field pickup device is that a distance between the microphone and the horn is relatively large so that the echo of the sound signal played by the smart speaker itself and received by the microphone will not be clipped and saturated. Moreover, the user becomes closer to the microphone, which may improve the speech recognition performance.

FIG. 1A is a schematic diagram of a scenario in which a far-field pickup device is applied to a smart speaker according to an embodiment of the disclosure. A smart speaker may recognize a speech command transmitted by a user, such as "turn up the volume" during the playback, and then perform an action in accordance with the speech command of the user, such as "turn up the volume". In other words, the smart speaker may recognize speech of persons in these voice signals while playing sound signals, thereby performing an action according to the speech of the person.

As shown in FIG. 1A, a far-field pickup device 1 according to an example embodiment of the disclosure includes a device body 11 with separate components and a microphone pickup unit 12. The device body 11 has a horn 1101 for playing a sound signal. The microphone pickup unit 12 may include a plurality of microphone units (or microphones) 1201. In FIG. 1A, each of the microphone units 1201 is a dot, and the microphone pickup unit 12 includes a dot matrix including the dots.

The microphone unit (or microphone) 1201 picks up a sound signal in the environment, including user speech, interference noise in the environment, an echo of the sound signal played by the smart speaker, and the like. The sound signal picked up by each of the microphone units 1201 is converted into a digital signal and the digital signal is sent to a processing device (not shown in the figure) in the device body 11. The processing device removes the echo of the sound signal played by the smart speaker and the interference noise in the environment from the received sound signal, to obtain user speech, and generates a control command according to the user speech, such as "turn up or turn down the volume of the speaker", "play a certain song", and the like.

FIG. 1B is a schematic diagram of a scenario in which a far-field pickup device is applied to a smart television (TV) according to an embodiment of the disclosure. A smart television can recognize a speech command transmitted by a user during playback, such as "switch to channel XX", and then perform an action in accordance with the speech command of the user, such as "switch to channel XX". In other words, the smart television may recognize speech of persons in these programs while playing TV programs, thereby performing an action according to the speech of the person.

As shown in FIG. 1B, a far-field pickup device 1 according to an example embodiment of the disclosure includes a device body 11 with separate components and a microphone pickup unit 12. The device body 11, that is, a TV body, has a display screen 1102 for displaying a video of the TV program and a horn 1101 for playing the sound of the TV program. The microphone pickup unit 12 may include a plurality of microphone units 1201. In FIG. 1B, each of the microphone units 1201 is a dot, and the microphone pickup unit 12 includes a dot matrix including the dots.

The microphone unit 1201 picks up a sound signal in the environment, including user speech, interference noise in the environment, and an echo of the sound of the TV program played by the smart TV. The sound signal picked up by each of the microphone units 1201 is converted into a digital signal and sent to a processing device (not shown in the figure) in the device body 11. The processing device removes the echo of the sound of the TV program played by the smart TV and the interference noise in the environment from the received sound signal, to obtain user speech, and generates a control command according to the user speech, such as "switch to a channel", "turn up or turn down the volume", and the like.

FIG. 1C is a schematic diagram of a scenario in which a far-field pickup device is applied to voice-activated intelligent navigation according to an embodiment of the disclosure. The voice-activated intelligent navigation means that during driving, a navigation route may be planned according to a starting point and a destination input by the user, and speech corresponding to the planned navigation route is broadcast during the driving, so that the user may drive according to the speech broadcast route while driving. In the voice-activated intelligent navigation, the user may issue a speech command during driving (e.g., while the speech is being broadcast), such as "switch to a place XX", "help me find a nearby parking space", "change the zooming of navigation display" and so on. A voice-activated intelligent navigation device recognizes the speech command of the user and performs an action according to the speech command, such as restarting navigation according to a new destination XX, helping the user find nearby parking spaces, changing the zooming of navigation display, and the like.

As shown in FIG. 1C, a far-field pickup device 1 according to an example embodiment of the disclosure includes a device body 11 with separate components and a microphone pickup unit 12. The device body 11, that is, the voice-activated intelligent navigation device, has a display screen 1106 and a horn 1101. The display screen 1106 is configured to input the destination and display the navigation route, and the horn 1101 is configured to play the speech broadcast by the voice-activated intelligent navigation device during navigation. In FIG. 1C, the microphone pickup unit 12 is located on one side close to the driver, to collect a speech command issued by the driver more clearly. The display screen 1106 is located in the middle, and the horn 1101 is located on one side of a front console away from the driver, to avoid clipping and saturation, thereby improving speech recognition performance. The microphone pickup unit 12 includes a plurality of microphone units 1201. Each of the microphone units 1201 is a dot, and the microphone pickup unit 12 includes a dot matrix including the dots.

The microphone unit 1201 picks up a sound signal in the environment, including user speech, interference noise in the environment, and an echo of voice broadcast by the voice-activated intelligent navigation device. The sound signal picked up by each of the microphone units 1201 is converted into a digital signal and sent to a processing device (not shown in the figure) in the device body 11. The processing device removes, from the received sound signal, the echo of the speech broadcast by the voice-activated intelligent navigation device and the interference noise in the environment, to obtain user speech, and generates a control command according to the user speech, such as restarting navigation according to the new destination XX, helping the user find nearby parking spaces, changing the zooming of the navigation display, and the like.

FIG. 1D is a schematic diagram of a scenario in which a far-field pickup device is applied to a KTV (karaoke television or karaoke entertainment establishment) music playback system according to an embodiment of the disclosure. The KTV music playback system may play accompaniment of the song through the horn according to the song selected by the user. When the user sings into the microphone in the accompaniment, the user's speech is to be recognized, and the user's speech is played together with the accompaniment through the horn.

As shown in FIG. 1D, a far-field pickup device 1 according to an example embodiment of the disclosure includes a device body 11 with separate components, a microphone pickup unit 12, a display screen 1102, and a song selector 1103. The song selector 1103 displays a list of songs for accompaniment, and the user may select a song to be sung from the list. The device body 11 is a main body of the KTV music playback system, and has a horn 1101 thereon for playing the accompaniment of the song selected by the user. The display screen 1102 is configured to display lyrics and pictures of the song selected by the user. The microphone pickup unit 12 includes a plurality of microphone units (not shown in the figure), each of the microphone units being a dot, and the microphone pickup unit 12 includes a dot matrix including the dots. The user may sing into the microphone including the microphone pickup unit 12. The sound of the user during singing, the interference noise in the environment, and the echo of the accompaniment played by the horn 1101 will be converted into digital signals by the microphone unit and sent to the processing device (not shown in the figure) in the device body 11. If the processing device does not eliminate the echo of the accompaniment, there is a time delay between the echo of the accompaniment and the accompaniment being played, which will form aliasing, resulting in a blurred sound. Therefore, the processing device needs to eliminate the echo of the accompaniment and the interference noise in the environment, and then play the voice of the user during singing.

FIG. 2A to FIG. 2D are each a schematic diagram of four construction layouts of a far-field pickup device according to an embodiment of the disclosure. As described above, the far-field pickup device 1 includes a device body 11 with separate components and a microphone pickup unit 12. There may be one or more microphone pickup units 12. The device body 11 may be built locally, that is, located at the same location as the microphone pickup unit 12, or a part (e.g., a horn and a receiver) thereof is built locally, and a core part for sound processing, that is, a processing device, is placed at a far end. The far end means a region that may be connected through the Internet or a telecommunication network but is not at the same location as the microphone pickup unit 12. The processing device may be connected to the horn and the receiver via the Internet, or may be connected in a wired or wireless form via a telecommunication network. FIG. 2A to FIG. 2D take the smart speaker shown in FIG. 1A as an example to illustrate different construction layouts of the far-field pickup device, but it would be understood by a person skilled in the art that FIG. 2A to FIG. 2D may also be used as the construction layout of the far-field pickup device of FIG. 1B to FIG. 1D with slight changes. This change may be easily made by the person skilled in the art based on the teachings of the embodiments of the disclosure.

Based on the embodiment of the far-field pickup device shown in FIG. 1A, the device body 11 and the microphone pickup unit 12 may be built locally, and there is only one device body 11 and one microphone pickup unit 12. Since there is only one microphone pickup unit 12 in the room, it is possible that the microphone pickup unit 12 is also distant from the user, resulting in low speech recognition performance. Therefore, in the construction layout shown in FIG. 2A, the far-field pickup device 1 includes a plurality of microphone pickup units 12 and a device body 11 that are locally arranged. The device body 11 has a horn 1101. For example, a microphone pickup unit 12 is arranged in every corner of the room, so that there is always one microphone pickup unit 12 relatively close to the user, thereby avoiding the low speech recognition performance due to a long distance between the user and the microphone pickup unit 12. After the user utters speech, the microphone unit 1201 of the plurality of microphone pickup units 12 with different distances from the user will receive the speech of the user, and transmit the user speech, an echo of the sound broadcast by the horn 1101, and the interference noise in the environment to the device body 11 together, and the device body 11 processes these signals according to different principles to obtain the speech of the user. The device body 11 may include different receivers corresponding to different microphone pickup units 12, or may include only one receiver for receiving signals sent by all microphone pickup units 12, which will be described in detail later with reference to FIG. 4A and FIG. 4B.

Figure 2A:
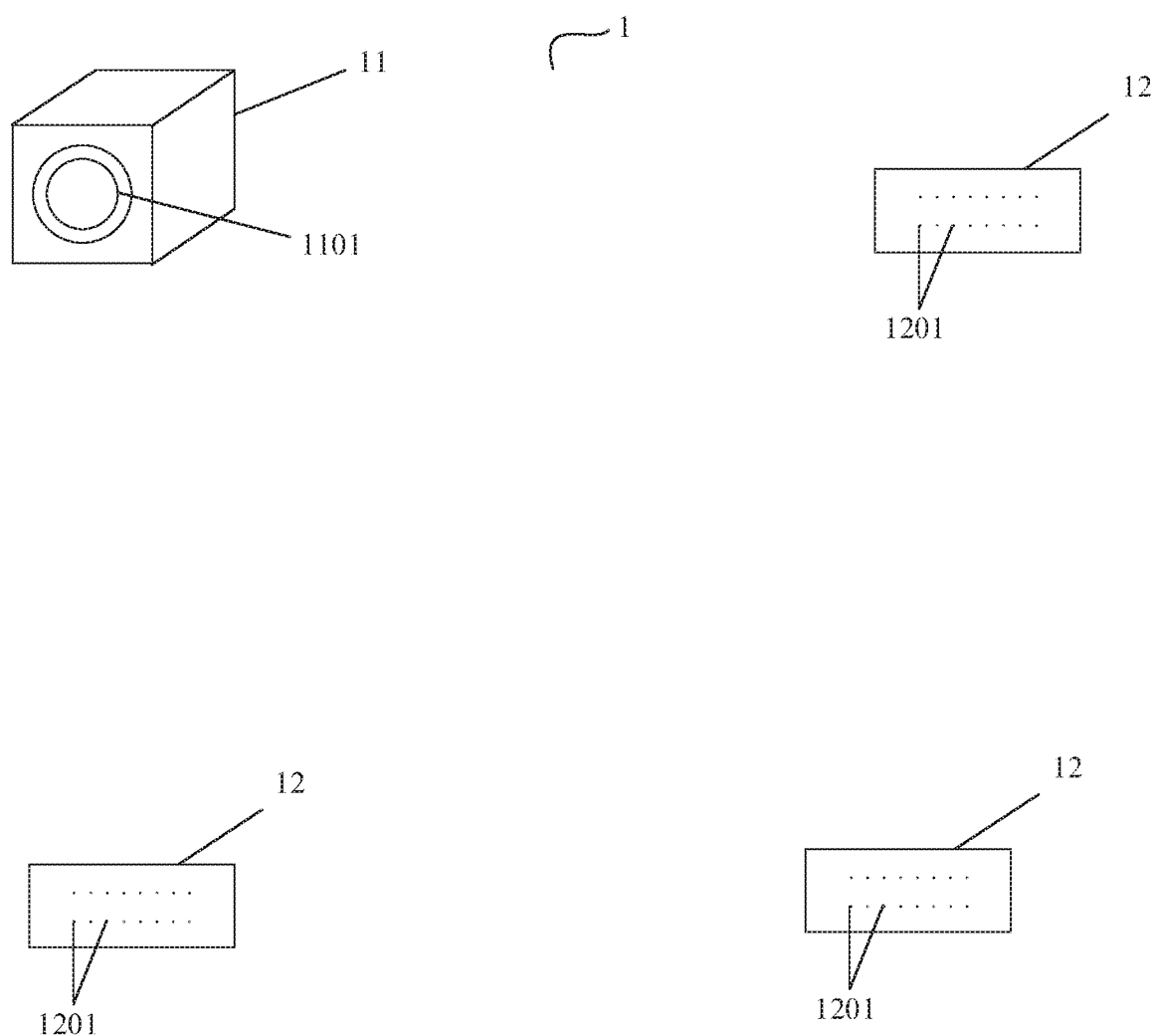
FIG. 2A is a schematic diagram of a construction layout of a far-field pickup device according to an embodiment of the disclosure.
Figure 2B:
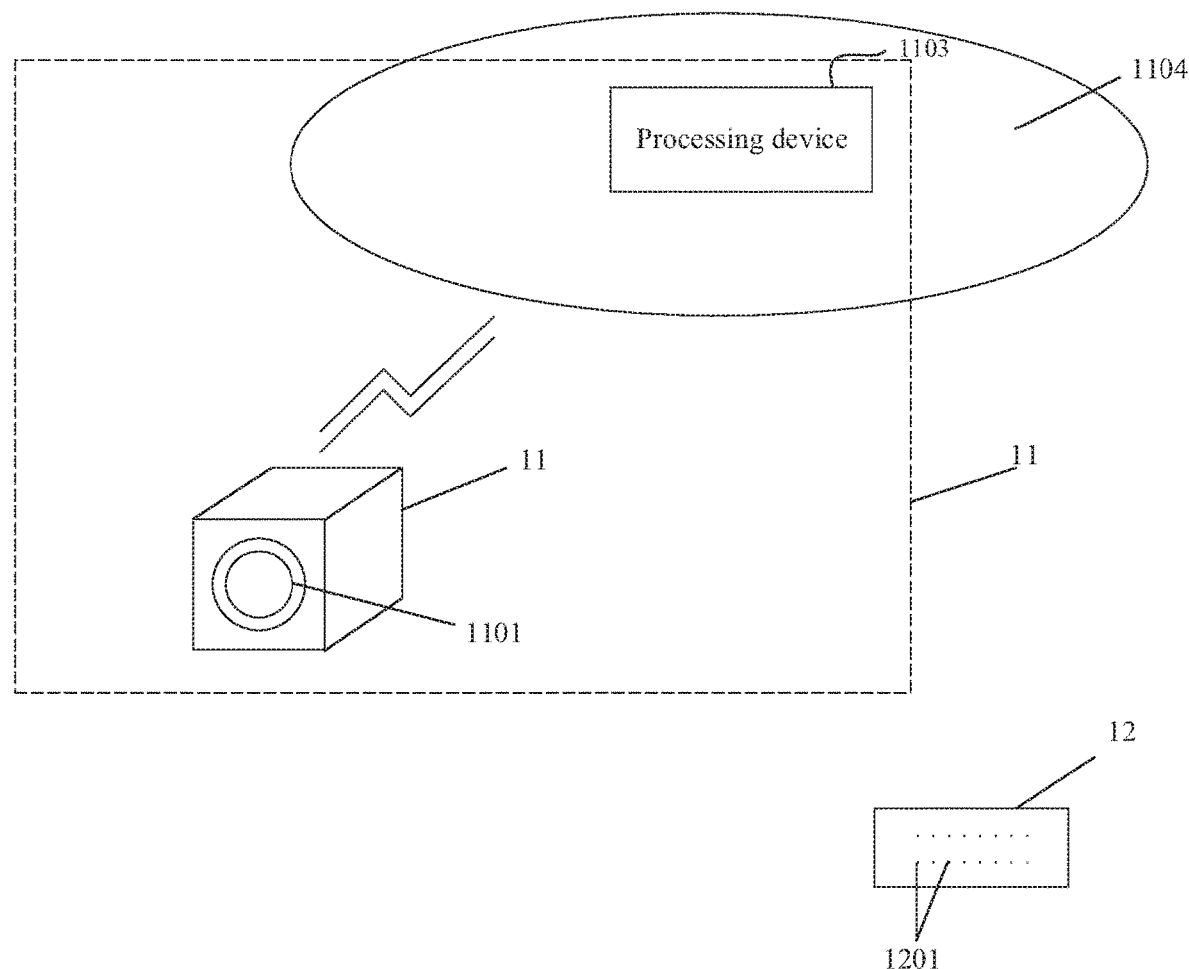
FIG. 2B is a schematic diagram of a construction layout of a far-field pickup device according to an embodiment of the disclosure.

In the construction layout shown in FIG. 2B, the microphone pickup unit 12 is arranged locally, the horn 1101 and the receiver (not shown) in the device body 11 are also arranged locally, and the processing device 1103 as the core part for sound processing is arranged at a far end 1104. The layout is arranged in such a manner because the processing of the sound signal is irrelevant to the collection and playback of the live sound, and local arrangement of the processing device 1103 is unnecessary. The processing device 1103 is arranged at the far end 1104, which facilitates reduction in the volume of the component locally arranged. After the user utters speech, the microphone unit 1201 of the microphone pickup unit 12 receives the speech of the user, and transmit the user speech, an echo of the sound broadcast by the horn, and the interference noise in the environment to a receiver of the device body 11 together, and the receiver of the device body 11 transmits the received signal to the processing device 1103 at the far end 1104 via the Internet or telecommunication connection. The processing device 1103 removes the echo of the sound played by the horn and the interference noise in the environment from the received sound signal, to obtain user speech, generates a control command according to the user speech, such as "turn up or turn down the volume of the speaker", and transmits the control command to the horn 1101, thereby controlling the playing volume.

Figure 2C:
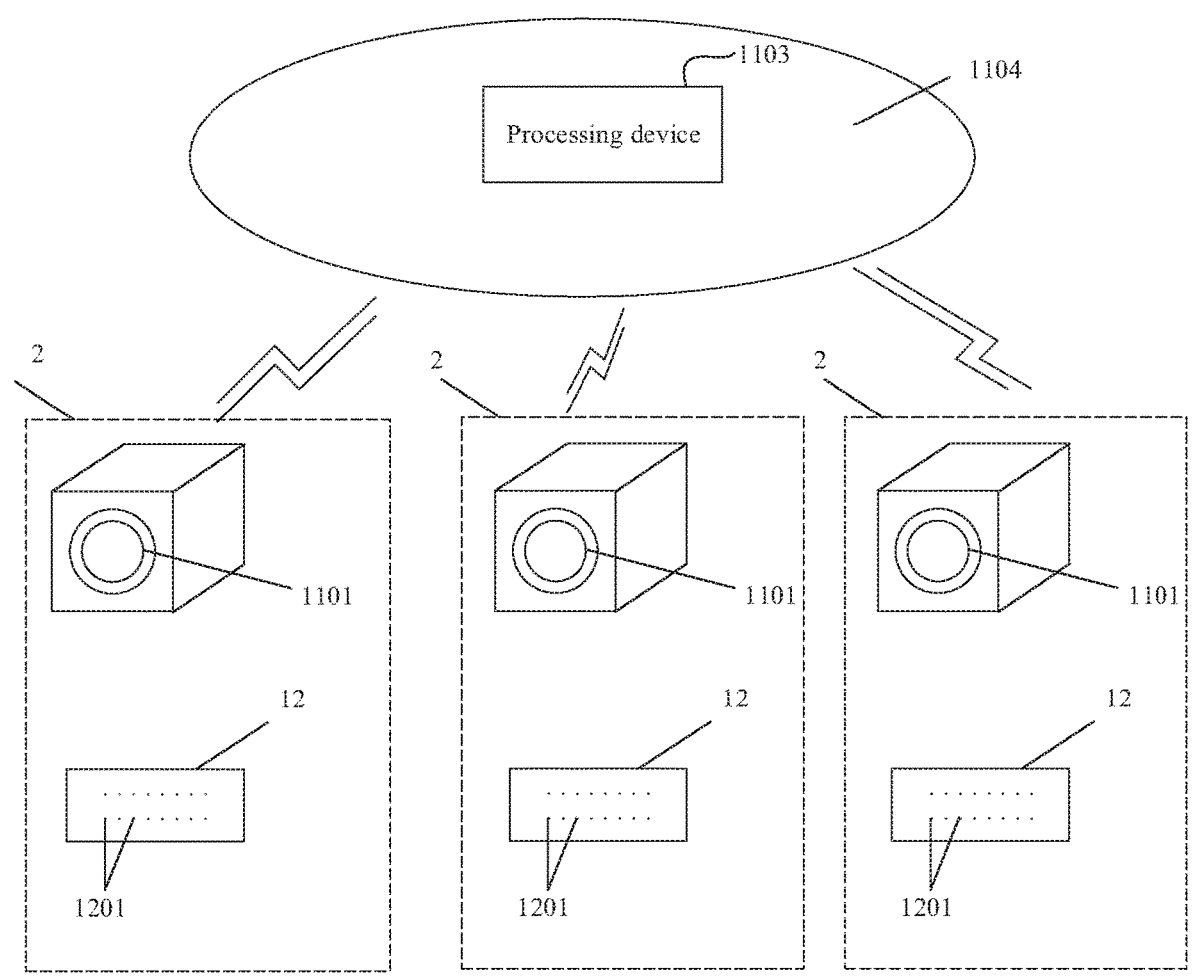
FIG. 2C is a schematic diagram of a construction layout of a far-field pickup device according to an embodiment of the disclosure.

In the construction layout shown in FIG. 2C, the processing device 1103 at the far end 1104 communicates with horns 1101 and receivers (not shown) at a plurality of locations 2 (for example, a plurality of rooms), and processes signals sent by the microphone pickup units 12 at the plurality of locations 2 to the receivers, that is, a processing device 1103 at the far end 1104 may form the device body 11 with the horns 1101 and the receivers at the plurality of locations 2. The horn 1101, the receiver, and the microphone pickup unit 12 are arranged locally. After a user utters speech, the microphone unit 1201 of the local microphone pickup unit 12 receives the speech of the user, and transmit the user speech, an echo of the sound broadcast by the horn, and the interference noise in the environment to a receiver of the device body 11 together via the Internet or telecommunication connection, and the receiver of the device body 1 transmits the received signal to the processing device 1103 at the far end 1104 again via the Internet or telecommunication connection. The processing device 1103 removes the echo of the sound played by the horn and the interference noise in the environment from the received sound signal, to obtain user speech, generates a control command according to the user speech, such as "turn up or turn down the volume of the speaker", and transmits the control command to the horn 1101 via the Internet or telecommunication connection, thereby controlling the playing volume. In FIG. 2C, a processing device 1103 that is irrelevant to the collection and playback of live sound is arranged at the far end 1104, and is shared by local devices located at a plurality of locations, facilitating effective use of resources.

Figure 2D:
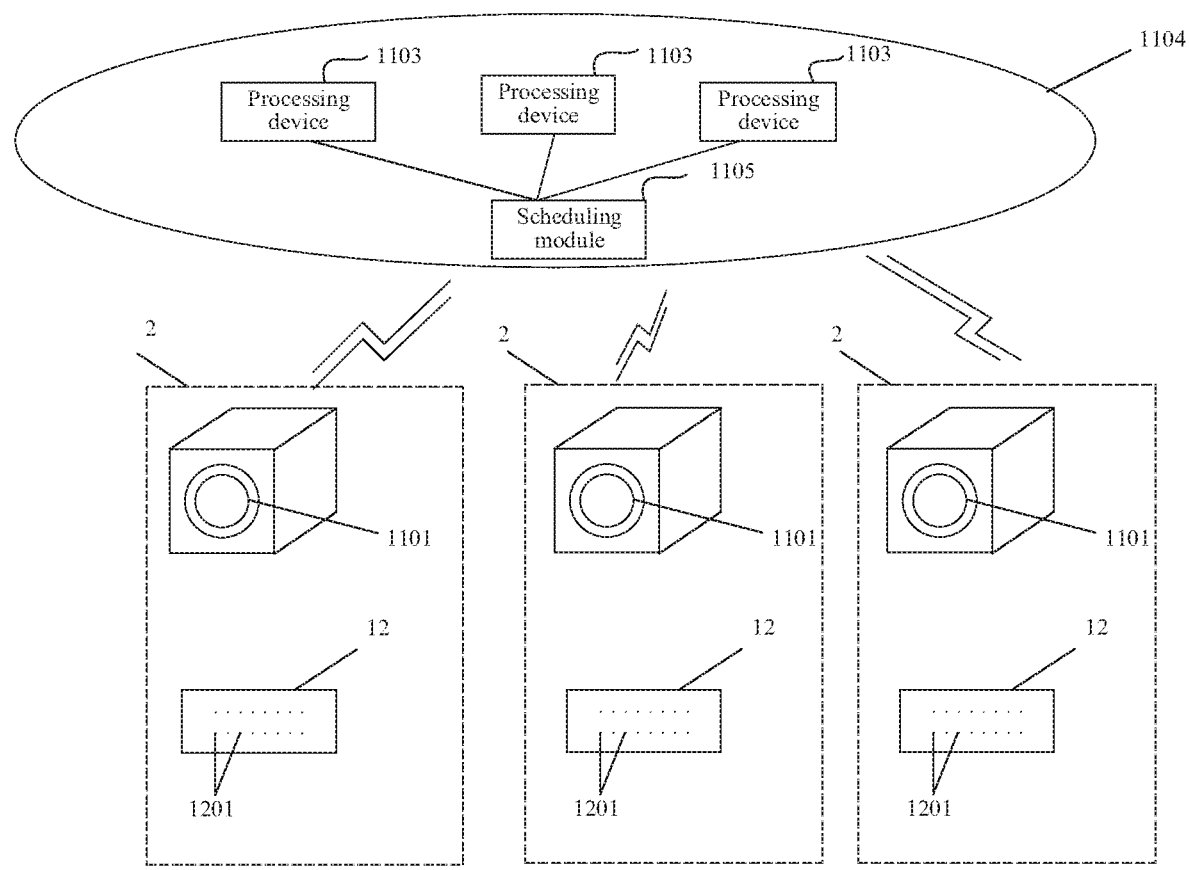
FIG. 2D is a schematic diagram of a construction layout of a far-field pickup device according to an embodiment of the disclosure.

In the construction layout shown in FIG. 2D, the receiver communicates, through a scheduling module 1105, with a plurality of processing devices 1103 located at the far end 1104. When the receiver receives the signal sent by the microphone pickup unit 12 arranged locally, the scheduling module 1105 specifies a processing device 1103 for processing the signal. In other words, the processing devices 1103 at the far end 1104 that constitute the device body 11 with the horn 1101 and the receiver at a location 2 are not fixed. The advantage of this layout is that the combination of the processing device 1103, the horn 1101, and the receiver is not fixed. Therefore, when the sound signal sent by the local receiver is received, a processing device 1103 specified for processing is determined by the scheduling module 1105 according to the current load of the processing device 1103, so that the processing load of each processing device 1103 may be balanced, and network resources may be effectively allocated, thereby avoiding overload caused by one processing device simultaneously processing the sound signals sent by a plurality of local receivers. After a user utters speech, the microphone unit 1201 of the local microphone pickup unit 12 receives the speech of the user, and transmits the user speech, an echo of the sound broadcast by the horn, and the interference noise in the environment to a receiver of the device body 11 together via the Internet or telecommunication connection. The receiver of the device body 11 transmits the received signal to the scheduling module 1105 at the far end 1104 via the Internet or telecommunication connection. The scheduling module 1105 allocates a processing device 1103 for the received signal, and sends the received signal to the processing device 1103. The processing device 1103 removes the echo of the sound played by the horn and the interference noise in the environment from the received signal, to obtain user speech, generates a control command according to the user speech, such as "turn up or turn down the volume of the speaker", and transmits the control command to the local horn (that is, locally arranged) 1101 via the Internet or telecommunication connection, thereby controlling the played sound.

Figure 3A:
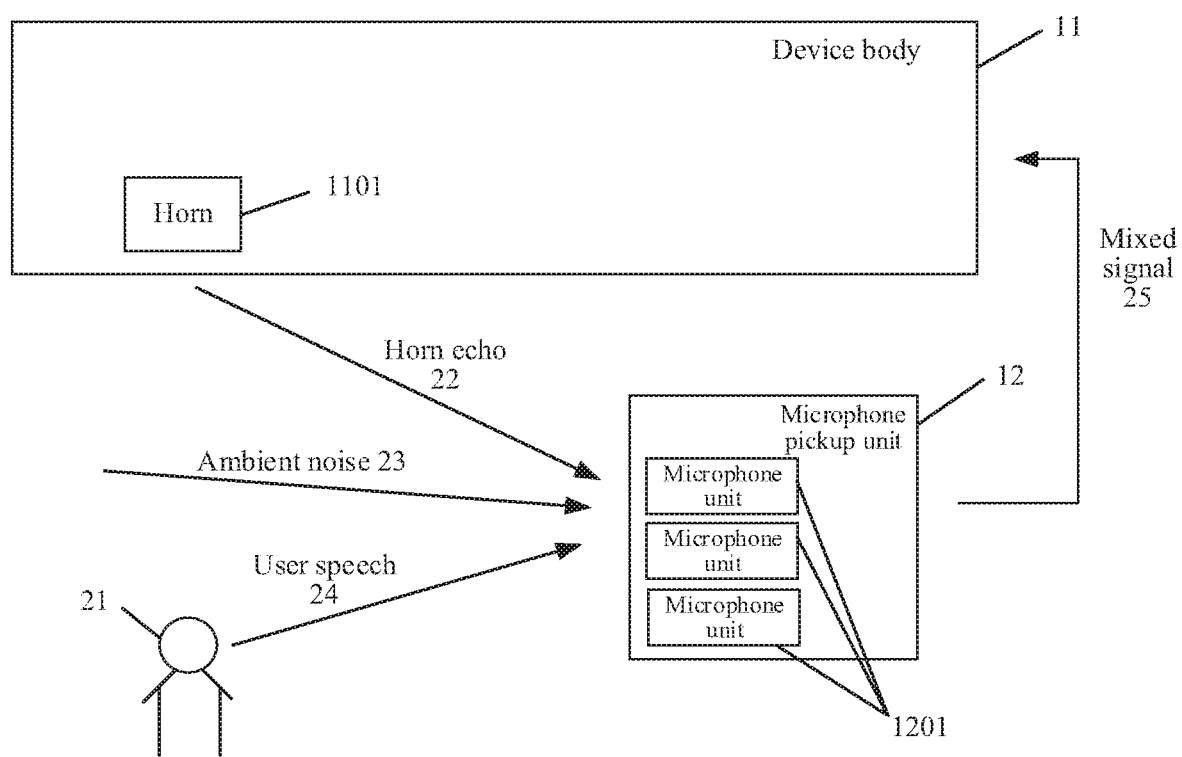
FIG. 3A is a schematic diagram for describing a far-field pickup device that is applied to a smart speaker according to an embodiment of the disclosure.

FIG. 3A is a schematic diagram for describing a far-field pickup device that is applied to a smart speaker according to an embodiment of the disclosure.

As shown in FIG. 3A, a far-field pickup device 1 according to an example embodiment of the disclosure includes a device body 11 with separate components and a microphone pickup unit 12. The device body 11 has a horn 1101 for playing a sound signal. The microphone pickup unit 12 may include a plurality of microphone units 1201. In FIG. 3A, each of the plurality of microphone units 1201 is a dot, and the microphone pickup unit 12 includes a dot matrix including the dots. The microphone unit 1201 picks up a sound signal in the environment, including user speech 24 of a user 21, interference noise 23 in the environment (ambient noise), and an echo 22 (a horn echo) of a sound signal played by a smart speaker. Each of the microphone units 1201 converts the collected sound signal into a digital signal (that is, a mixed signal 25) to be sent to a processing device in the device body 11. The processing device removes the echo of the sound signal played by the smart speaker and the interference noise in the environment from the received mixed signal 25, to obtain user speech, and generates a control command according to the user speech.

Figure 3B:
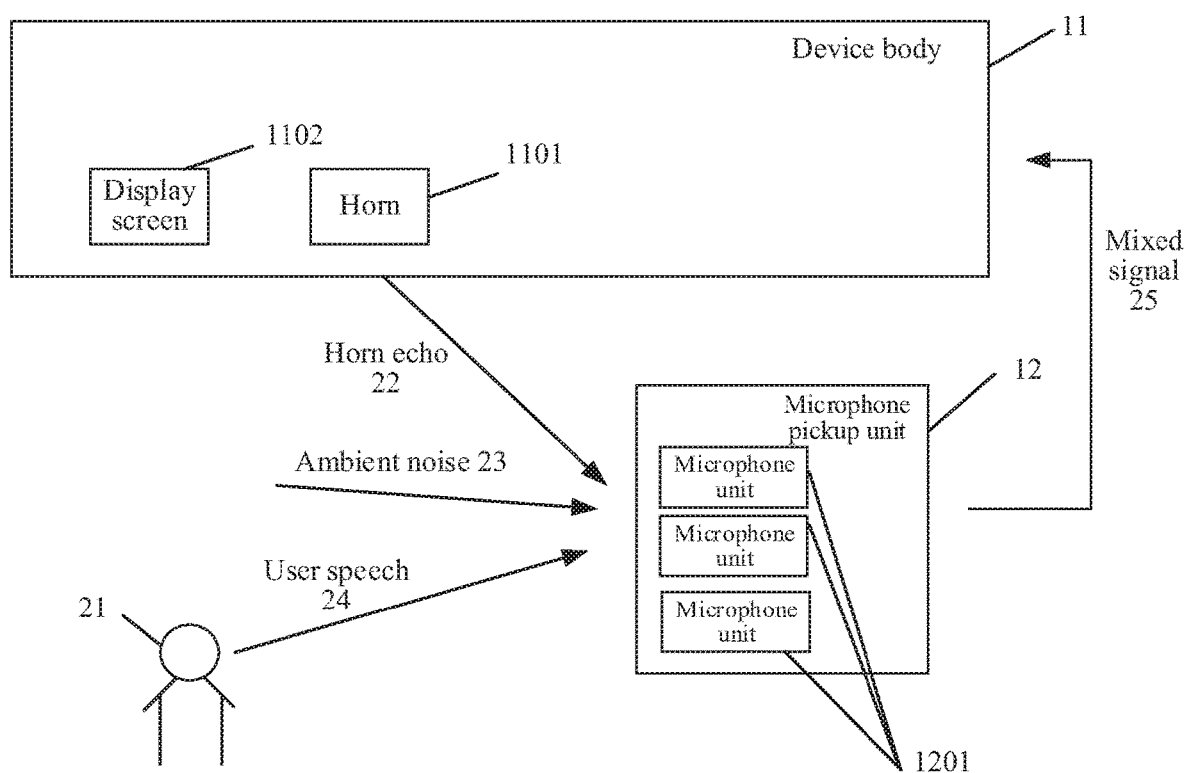
FIG. 3B is a schematic diagram for describing a far-field pickup device that is applied to a smart television according to an embodiment of the disclosure.

FIG. 3B is a schematic diagram for describing a far-field pickup device that is applied to a smart television according to embodiment of the disclosure.

As shown in FIG. 3B, a far-field pickup device 1 according to an example embodiment of the disclosure includes a device body 11 with separate components and a microphone pickup unit 12. The device body 11, that is, a TV body, has a display screen 1102 for displaying a video of a TV program and a horn 1101 for playing the sound of the TV program. The microphone pickup unit 12 may include a plurality of microphone units 1201. The user watches the picture of the TV program displayed on the display screen 1102 and listens to the sound of the TV program played by the horn 1101. During playing of the sound of the TV program, the user may issue a speech command to control the TV, such as "switch to channel XX". The microphone unit 1201 picks up a sound signal in the environment, including user speech 24, interference noise 23 in the environment (ambient noise), and an echo 22 (a horn echo) of the sound of the TV program played by the horn 1101. Each of the microphone units 1201 converts the collected sound signal into a digital signal (that is, a mixed signal 25) to be sent to a processing device in the device body 11. The processing device removes the echo of the sound of the TV program played by the smart TV and the interference noise in the environment from the received mixed signal 25, to obtain user speech, and generates a control command according to the user speech, such as "switch to a channel", and the like.

Figure 3C:
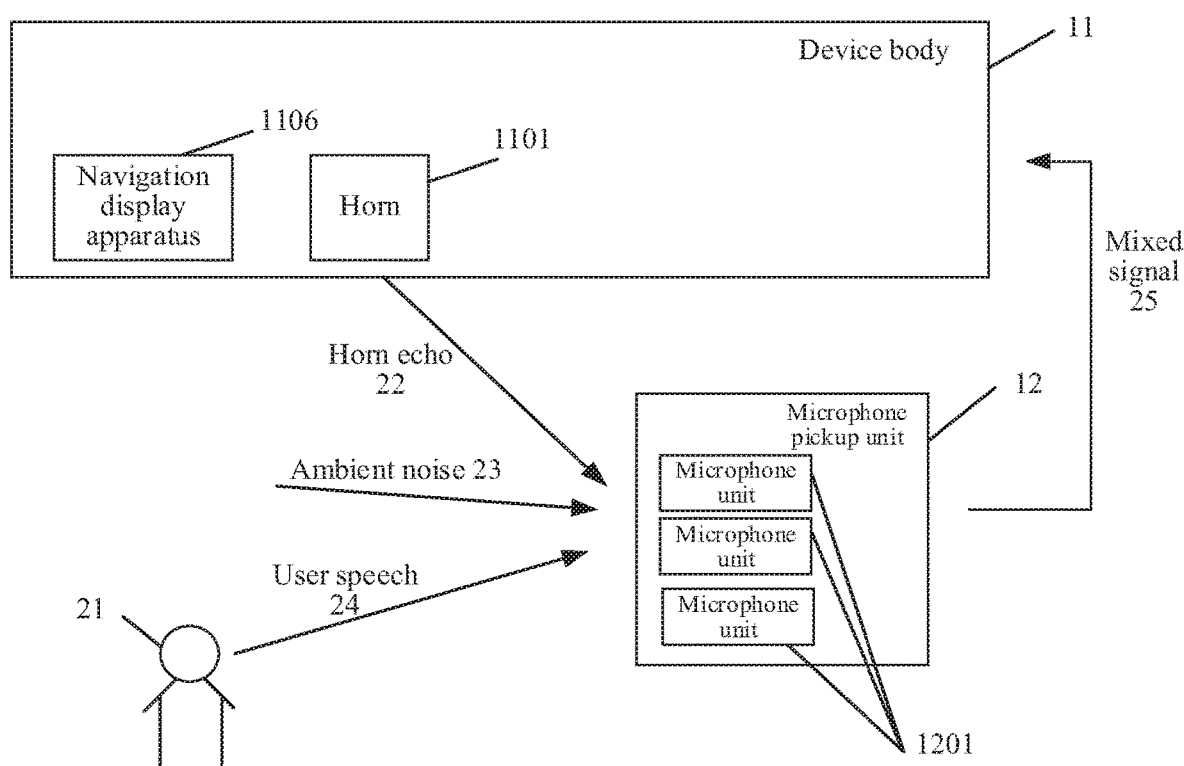
FIG. 3C is a schematic diagram for describing a far-field pickup device that is applied to voice-activated intelligent navigation according to an embodiment of the disclosure.

FIG. 3C is a schematic diagram for describing a far-field pickup device that is applied to voice-activated intelligent navigation according to an embodiment of the disclosure.

As shown in FIG. 3C, a far-field pickup device 1 according to an example embodiment of the disclosure includes a device body 11 with separate components and a microphone pickup unit 12. The microphone pickup unit 12 includes a plurality of microphone units 1201. Each of the microphone units 1201 is a dot, and the microphone pickup unit 12 includes a dot matrix including the dots. The device body 11, that is, the voice-activated intelligent navigation device, has a display screen 1106 and a horn 1101. The display screen 1106, also referred to as a navigation display apparatus 1106, is configured to input a destination and display a navigation route, and the horn 1101 is configured to play the speech broadcast by the voice-activated intelligent navigation device during navigation. During broadcasting the voice, the user may issue a speech command to control the intelligent navigation device, for example, "I want to change my route to XX". The microphone unit 1201 picks up a sound signal in the environment, including user speech 24, interference noise 23 in the environment (or may be referred to as ambient noise), and an echo 22 (or may be referred to as a horn echo) of speech played by the voice-activated intelligent navigation device. Each of the microphone units 1201 converts the collected sound signal into a digital signal (that is, a mixed signal 25) to be sent to a processing device in the device body 11. The processing device removes, from the received mixed signal 25, the echo of the speech broadcast by the voice-activated intelligent navigation device and the interference noise in the environment, to obtain user speech, and generates a control command according to the user speech, such as restarting navigation according to a new destination XX, and the like.

Figure 3D:
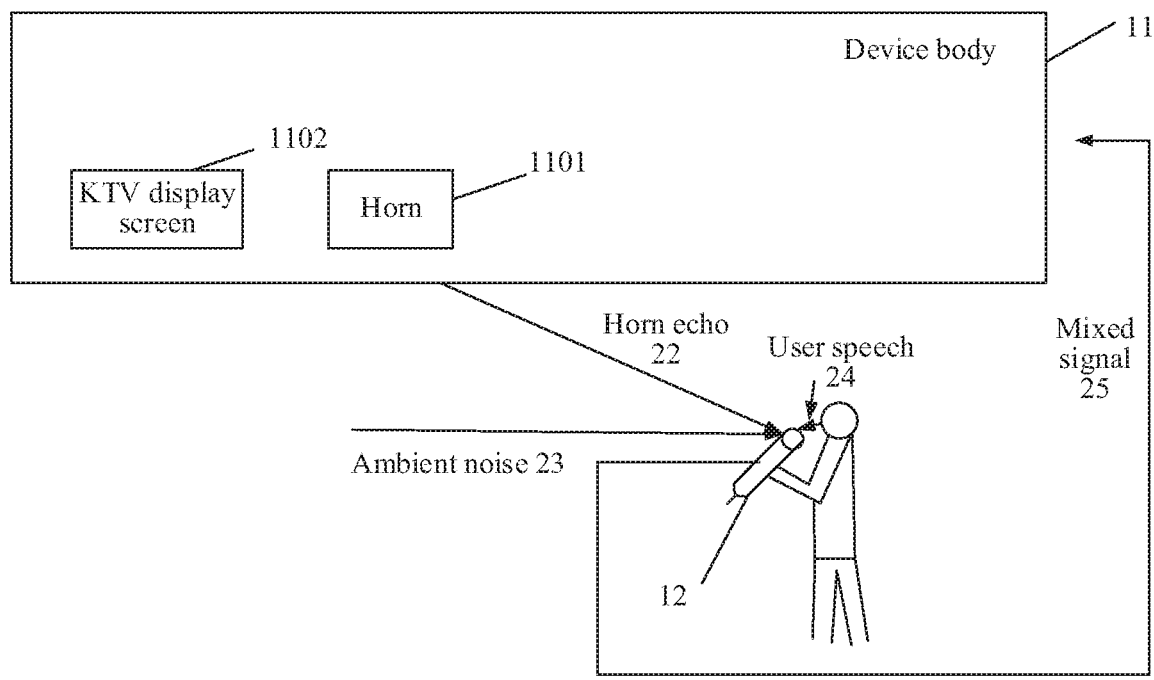
FIG. 3D is a schematic diagram for describing a far-field pickup device that is applied to a KTV music playback system according to an embodiment of the disclosure.

FIG. 3D is a schematic diagram for describing a far-field pickup device is applied to a KTV music playback system according to an embodiment of the disclosure.

As shown in FIG. 3D, a far-field pickup device 1 according to an example embodiment of the disclosure includes a device body 11 with separate components and a microphone pickup unit 12. A user selects a song to be sung in a song selector. A device body 11 is a main body of the KTV music playback system, and has a horn 1101 and a KTV display screen 1102. The horn 1101 is configured to play accompaniment of the song selected by the user, and the KTV display screen 1102 is configured to display lyrics and pictures of the song selected by the user. The user sings to the microphone pickup unit 12, and the singing voice (referred to as user speech) 24, interference noise 23 (referred to as ambient noise) in the environment, and an echo 22 (referred to as a horn echo) of the accompaniment played by the horn are converted into digital signals (that is, a mixed signal 25) by the microphone unit (not shown) of the microphone pickup unit 12 and together sent to the processing equipment in the device body 11. The processing device eliminates the echo of the accompaniment in the mixed signal 25 and the interference noise in the environment, and then plays the voice of the user during singing.

Figure 4A:
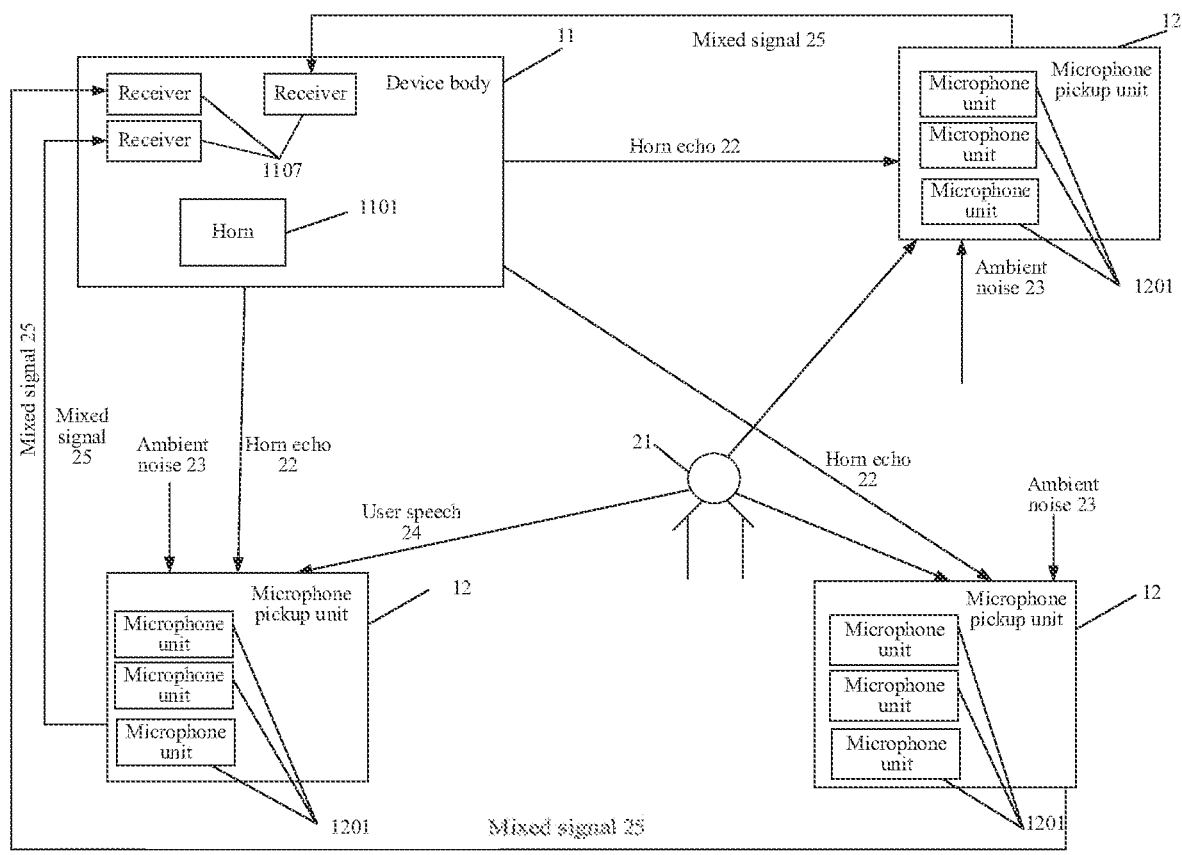
FIG. 4A is a schematic diagram of a detailed construction layer of the far-field pickup device of FIG. 2A according to an embodiment of the disclosure.
Figure 4B:
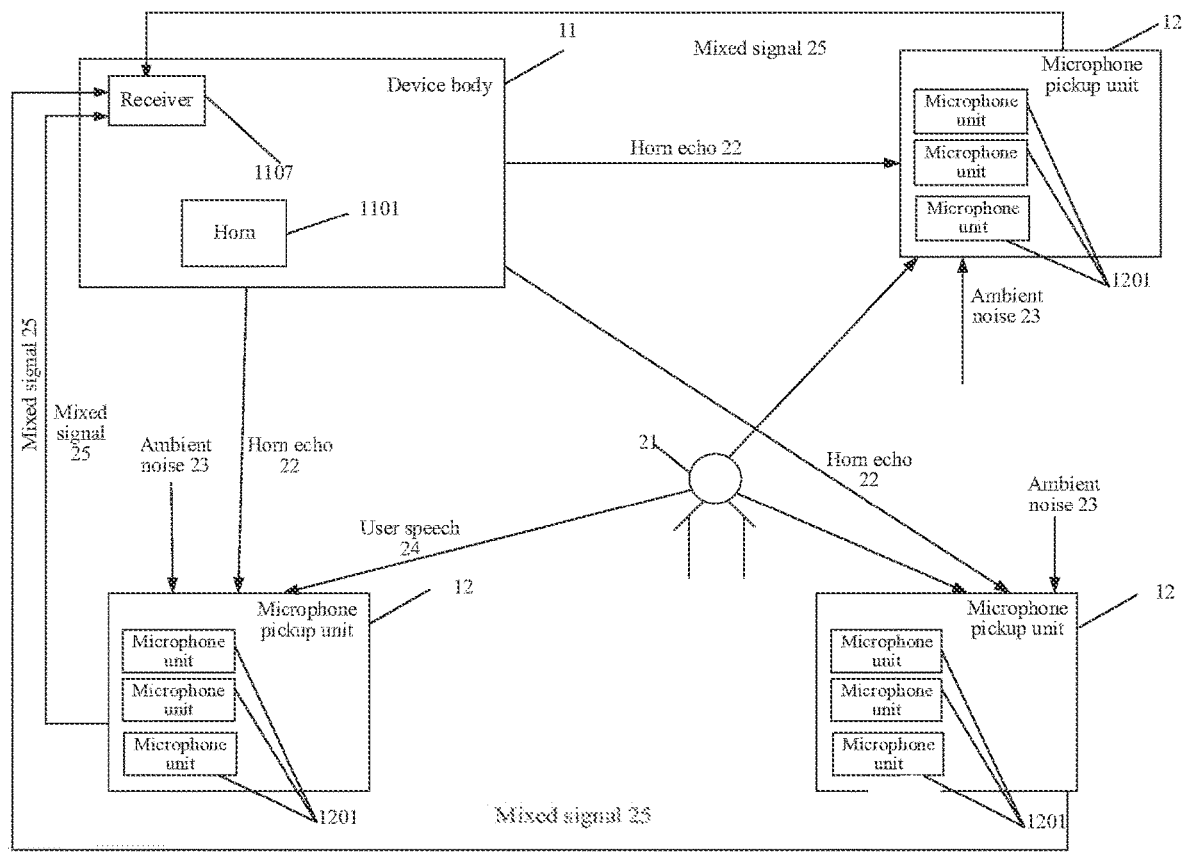
FIG. 4B is a schematic diagram of a detailed construction layer of the far-field pickup device of FIG. 2A according to an embodiment of the disclosure.

FIG. 4A and FIG. 4B are each a schematic diagram of a detailed construction layout of a far-field pickup device corresponding to FIG. 2A. FIG. 4A corresponds to a situation in which the device body 11 in FIG. 2A has a plurality of receivers respectively receiving mixed signals 25 reported by a plurality of microphone pickup units 12. FIG. 4B corresponds to a situation in which the device body 11 in FIG. 2A has a receiver receiving mixed signals 25 reported by the plurality of microphone pickup units 12.

In the schematic diagram shown in FIG. 4A, three microphone pickup units 12 are respectively placed in three corners of the room. Each of the microphone pickup units 12 includes three microphone units 1201. Although FIG. 4A shows that there are three microphone pickup units 12 in the same room, it would be understood by a person skilled in the art that there may be less or more microphone pickup units 12. Although FIG. 4A shows that there are three microphone units 1201 in the same microphone pickup unit 12, it would be understood by a person skilled in the art that there may be less or more microphone units 1201.

After the user utters the voice, since distances between the microphone pickup units 12 and the user are different, signal strength of the user speech received by the microphone pickup units is different. In an embodiment, each of the microphone pickup units 12 converts the received user speech 24, an echo 22 (or a horn echo) of a sound played by a horn, and interference noise 23 (or ambient noise) in the environment into a mixed signal 25 to be together sent to a receiver 1107 of the device body 11. The microphone pickup unit 12 may be connected to the receiver 1107 in a wired manner, to form a one-to-one correspondence. In another embodiment, the microphone pickup unit 12 may send the mixed signal 25 in a group, but the mixed signal 25 carries a specific identifier of the microphone pickup unit 12, and each receiver 1107 extracts, according to the identifier, the mixed signal 25 sent by the microphone pickup unit 12 corresponding to the receiver from the received mixed signal 25. After each receiver 1107 extracts the mixed signal 25 sent by the respective microphone pickup unit 12, the processing device removes the echo 22 (a horn echo) of the sound broadcast by the horn from each mixed signal 25 and the interference noise 23 (or ambient noise) in the environment, to obtain extracted multichannel user speech, and then the extracted multichannel user speech is combined and processed, to obtain enhanced user speech. By placing the microphone pickup unit 12 at different positions in the room, the sound signals sent by each microphone pickup unit 12 are processed separately, and the processing results are combined, which facilitates improvement of accuracy of the speech recognition result despite a long distance between the user and the microphone pickup unit 12 if the microphone pickup unit 12 is only placed at a single position.

A difference between the diagrams shown in FIG. 4B and FIG. 4A is that there is only one receiver 1107 in the device body 11 of FIG. 4B which is configured to receive the mixed signal sent by each microphone pickup unit 12, and only one of the mixed signals is selected for processing according to one or more predetermined criterion(s), while other mixed signals are discarded. The predetermined criterion is, for example, selecting the mixed signal sent by the microphone pickup unit 12 closest to the user for processing. This selection method may be based on the fact that a shorter distance between the microphone pickup unit 12 and the user leads to a larger volume of the collected user speech, which facilitates improvement of the recognition effect of the user speech. The mixed signal may be selected by adding a timestamp to the mixed signal 25 when the microphone pickup unit 12 sends the mixed signal 25. The time stamp indicates a time at which the microphone pickup unit 12 receives the user speech. In this way, the receiver 1107 may then select, in chronological order of the receiving time indicated by the timestamp, the mixed signal 25 received at an earliest time indicated by the timestamp for processing. The quality of the user speech in the mixed signal 25 received at an earliest time indicated by the timestamp is the highest, which facilitates improvement of the speech recognition effect.

Figure 4C:
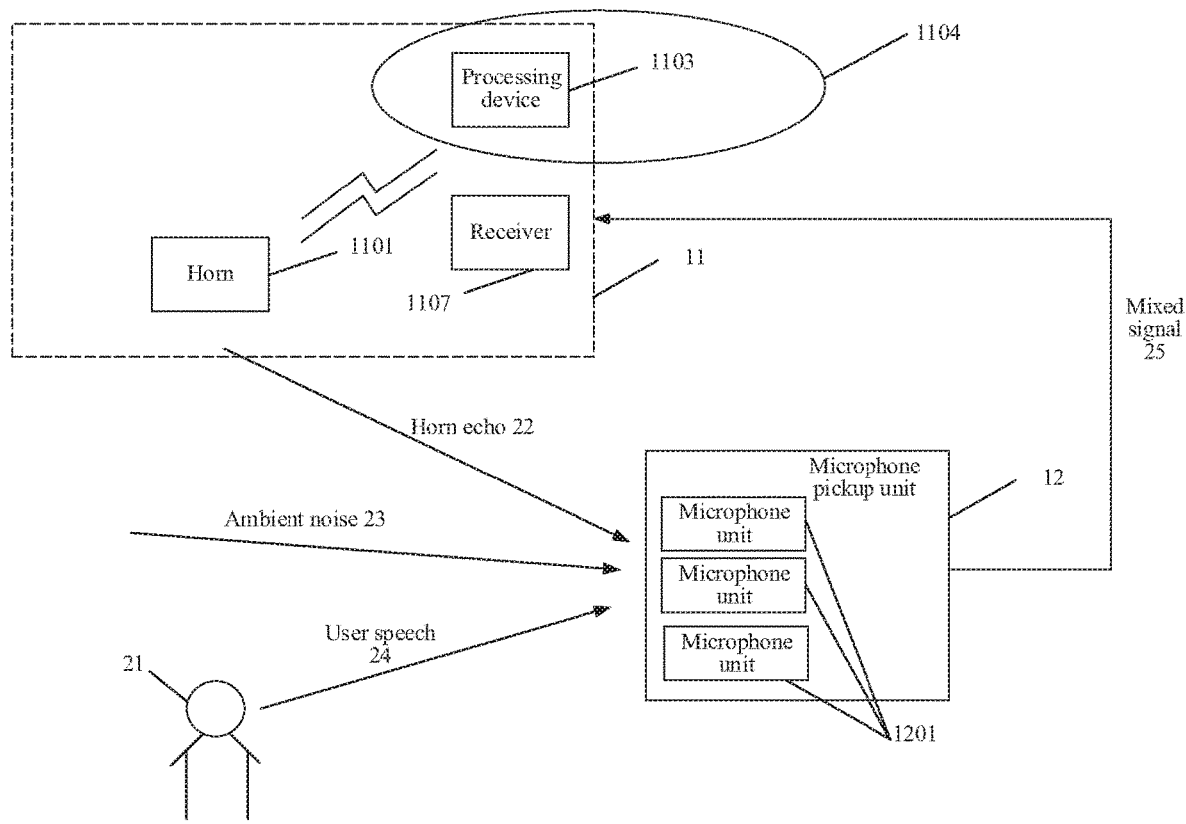
FIG. 4C is a schematic diagram of a detailed construction layer of the far-field pickup device of FIG. 2B according to an embodiment of the disclosure.

FIG. 4C is a schematic diagram of a detailed construction layer of the far-field pickup device corresponding to FIG. 2B. In FIG. 4C, a microphone pickup unit 12 is arranged locally. A horn 1101 and a receiver 1107 in a device body 11 are also arranged locally. A processing device 1103 as a core part for processing is arranged at a far end 1104. The processing device 1103 communicates with the local horn 1101 and receiver 1107 via the Internet or telecommunication connection. After a user utters speech, a microphone unit 1201 of the microphone pickup unit 12 receives user speech 24, converts the user speech 24, an echo 22 (or a horn echo) of a sound played by the horn, and interference noise 23 (or ambient noise) in the environment into a mixed signal 25 to be together sent to the local receiver 1107. The local receiver 1107 sends the received mixed signal 25 to the processing device 1103 at the far end 1104 via the Internet or telecommunication connection. The processing device 1103 removes the echo of the sound played by the horn and the interference noise in the environment from the received mixed signal 25, to obtain user speech, generates a control command according to the user speech, such as "turn up or turn down the volume of the speaker", and transmits the control command to the horn 1101 via the Internet or telecommunication connection, thereby controlling the playing volume.

Figure 4D:
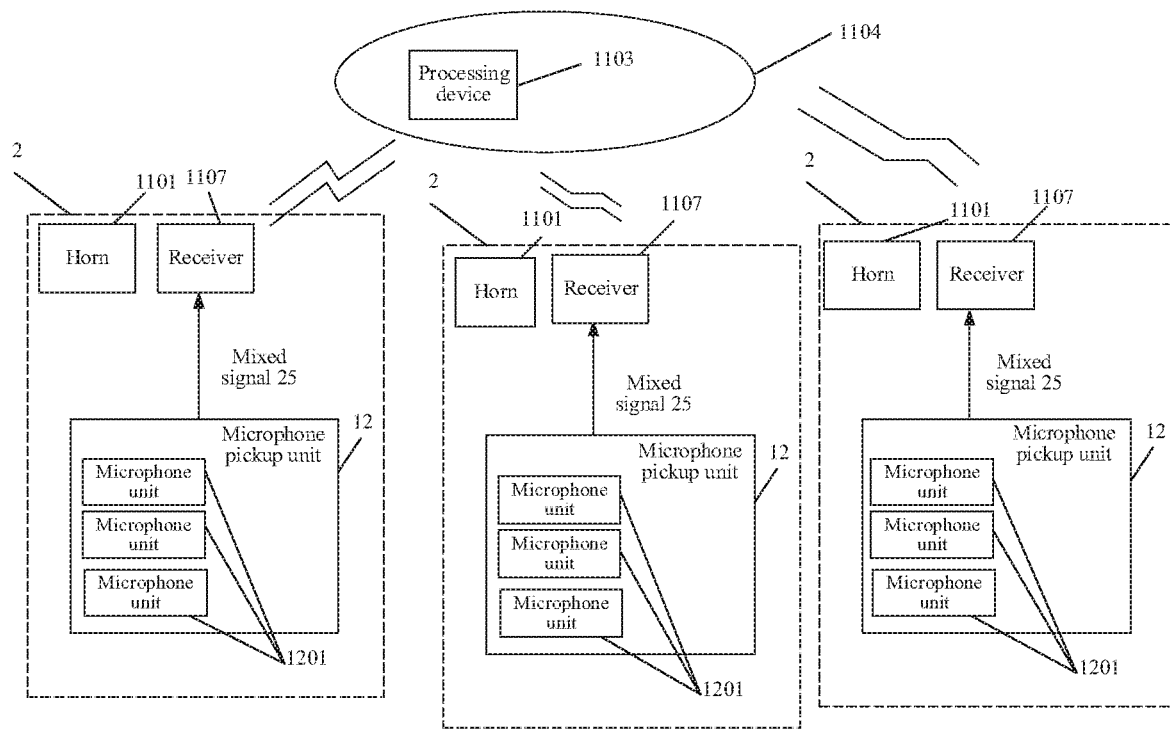
FIG. 4D is a schematic diagram of a detailed construction layer of the far-field pickup device of FIG. 2C according to an embodiment of the disclosure.

FIG. 4D is a schematic diagram of a detailed construction layer of the far-field pickup device corresponding to FIG. 2C. The processing device 1103 at the far end 1104 communicates with horns 1101 and receivers 1107 at a plurality of locations 2 (for example, rooms), and processes signals sent by the microphone pickup units 12 at the plurality of locations 2 to the receivers 1107, that is, a processing device 1103 at the far end 1104 may form a respective device body 11 with the horns 1101 and the receivers 1107 at the plurality of locations. After a user utters speech, a local microphone pickup unit 12 receives the user speech, converts the user speech, an echo of a sound played by the horn, and interference noise in the environment into a mixed signal 25 to be together sent to the local receiver 1107. The local receiver 1107 sends the received mixed signal to the processing device 1103 at the far end 1104 via the Internet or telecommunication connection. The processing device 1103 removes the echo of the sound played by the horn and the interference noise in the environment from the received mixed signal, to obtain user speech, generates a control command according to the user speech, and transmits the control command to the horn 1101 via the Internet or telecommunication connection, thereby controlling the playing volume. The mixed signals reported by each receiver 1107 are uniformly processed by the same processing device 1103, which facilitates effective use of resources.

Figure 4E:
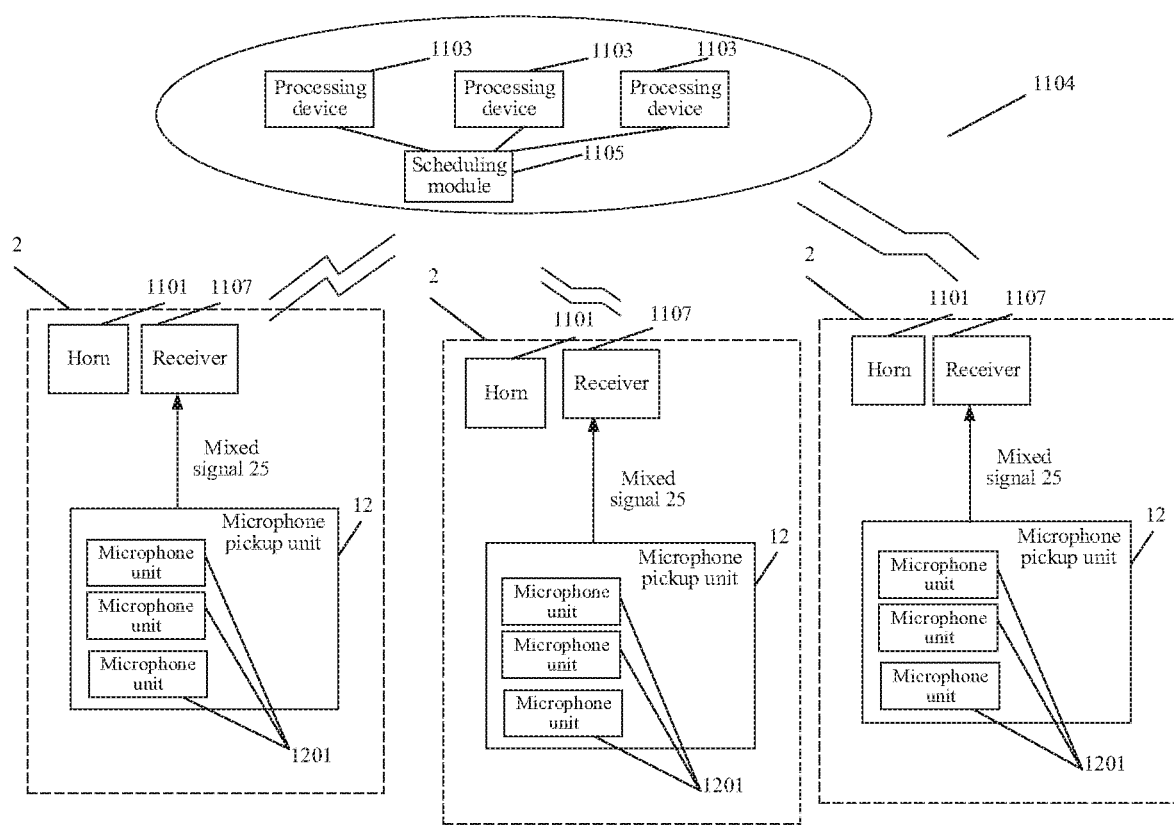
FIG. 4E is a schematic diagram of a detailed construction layer of the far-field pickup device of FIG. 2D according to an embodiment of the disclosure.

FIG. 4E is a schematic diagram of a detailed construction layer of the far-field pickup device corresponding to FIG. 2D. In the construction layout shown in FIG. 4E, a far end 1104 may include a plurality of processing devices 1103 and a scheduling module 1105. The scheduling module 1105 is connected to a plurality of processing devices 1103. A horn 1101 and a receiver 1107 located at any local location 2 and any processing device 1103 at the far end 1104 may be paired. The receiver 1107 transmits the mixed signal 25 to the scheduling module 1105 via the Internet or telecommunication connection when receiving the mixed signal 25 sent by the microphone unit 1201 of the local microphone pickup unit 12, and the scheduling module 1105 specifies a processing device 1103 to process the mixed signal. In this way, the processing devices 1103 at the far end 1104 that constitute the device body 11 with the horn 1101 and the receiver 1107 at a location 2 are not fixed. The advantage of this layout is that the combination of the processing device 1103, the horn 1101, and the receiver 1107 is not fixed. Therefore, when the mixed signal sent by the local receiver 1107 is received, a processing device 1103 specified for processing is determined by the scheduling module 1105 according to the current load of the processing device 1103, so that the processing load of each processing device 1103 may be balanced, and network resources may be effectively allocated.

According to an embodiment of the disclosure, a far-field pickup device 1 is provided. The far-field pickup device 1 is a device whose microphone is arranged alone separate from a main body on which a horn is located. An advantage of the far-field pickup device according to an embodiment of the disclosure is that a distance between the microphone and the horn is relatively large, so that the echo of the sound signal played by the smart speaker itself and received by the microphone will not be clipped and saturated. Moreover, the user becomes closer to the microphone, which may improve the speech recognition performance.

Figure 5:
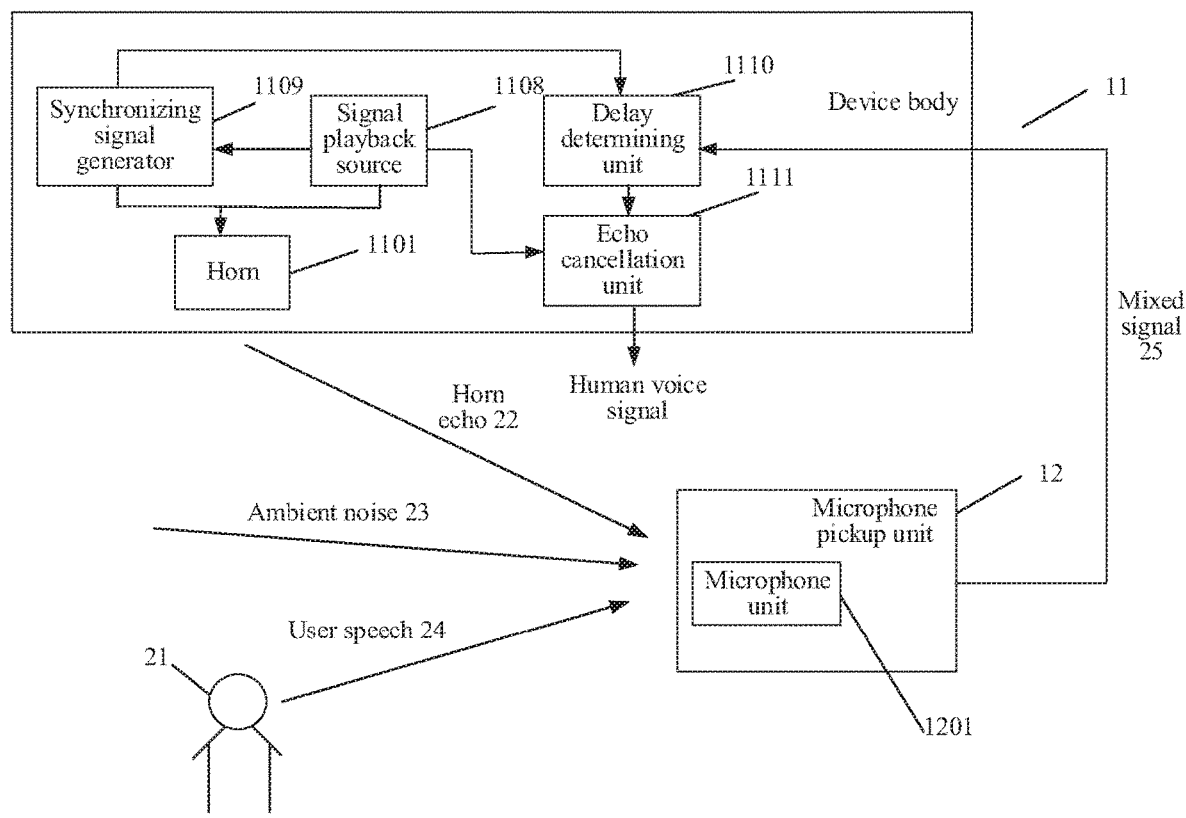
FIG. 5 is a schematic structural diagram of a far-field pickup device according to an embodiment of the disclosure.

FIG. 5 is a schematic structural diagram of a far-field pickup device according to an embodiment of the disclosure. As shown in FIG. 5, the far-field pickup device includes a device body 11 with separate components and a microphone pickup unit 12. The device body includes a signal playback source 1108, a synchronizing signal generator 1109, a horn 1101, a delay determining unit 1110, and an echo cancellation unit 1111.

The signal playback source 1108 is a component that generates a sound signal, and may be implemented by using an audio signal generating circuit. The audio signal generating circuit generates a corresponding audio signal according to a stored audio file or an audio file received through an antenna. Generally, the audio signal is 48 KHz or 96 KHz, which may be a digital signal, and the generation of each sample point is strictly synchronized with a clock signal.

In the application scenario of the smart speaker shown in FIG. 1A, the signal playback source 1108 is an audio signal generating circuit that generates a corresponding sound signal according to the stored audio file. For example, when the audio file is a music file, a corresponding sound signal is corresponding music. The audio file may be stored in the smart speaker or other terminal devices, for example, in a mobile phone of a user, and transmitted by other terminal devices to the smart speaker via Bluetooth transmission, and the like.

In the application scenario of the smart TV shown in FIG. 1B, the signal playback source 1108 is a frequency dividing circuit that may separate the audio signal received by the TV antenna. The frequency dividing circuit separates the video signal and the audio signal received by the TV antenna.

In the application scenario of voice-activated intelligent navigation shown in FIG. 1C, the signal playback source 1108 is a speech output circuit that converts, into speech output, prompt information generated by the navigation device. The speech output circuit stores basic sound waveforms of different persons, such as basic sound waveforms of Lin Chi-ling and Guo Degang, and converts, into the human voice set by the user, the prompt information generated by the navigation device according to setting by the user.

In the application scenario of the KTV playback system shown in FIG. 1D, the signal playback source 1108 is an audio signal generating circuit that converts, into a sound signal, the accompaniment of a song that the user selects in the KTV system. The user selects a song on the song selector, and the accompaniment file of the selected song is converted into an audio signal by the audio signal generating circuit.

The synchronizing signal generator 1109 is a signal generating circuit that may generate an output signal synchronized with an input signal. Specifically, in the embodiments of the disclosure, the synchronizing signal generator 1109 is configured to generate a synchronizing signal that is synchronized with a sound signal generated by the signal playback source 1108 and that occupies a second frequency band different from a first frequency band at which the sound signal is located. The second frequency band refers to a frequency band that does not overlap with the first frequency band. A frequency band is an interval of frequency. For example, a first frequency band is [48 kHz, 96 kHz], a second frequency band is [22 kHz, 24 kHz], and then the two are different frequency bands.

Figure 6:
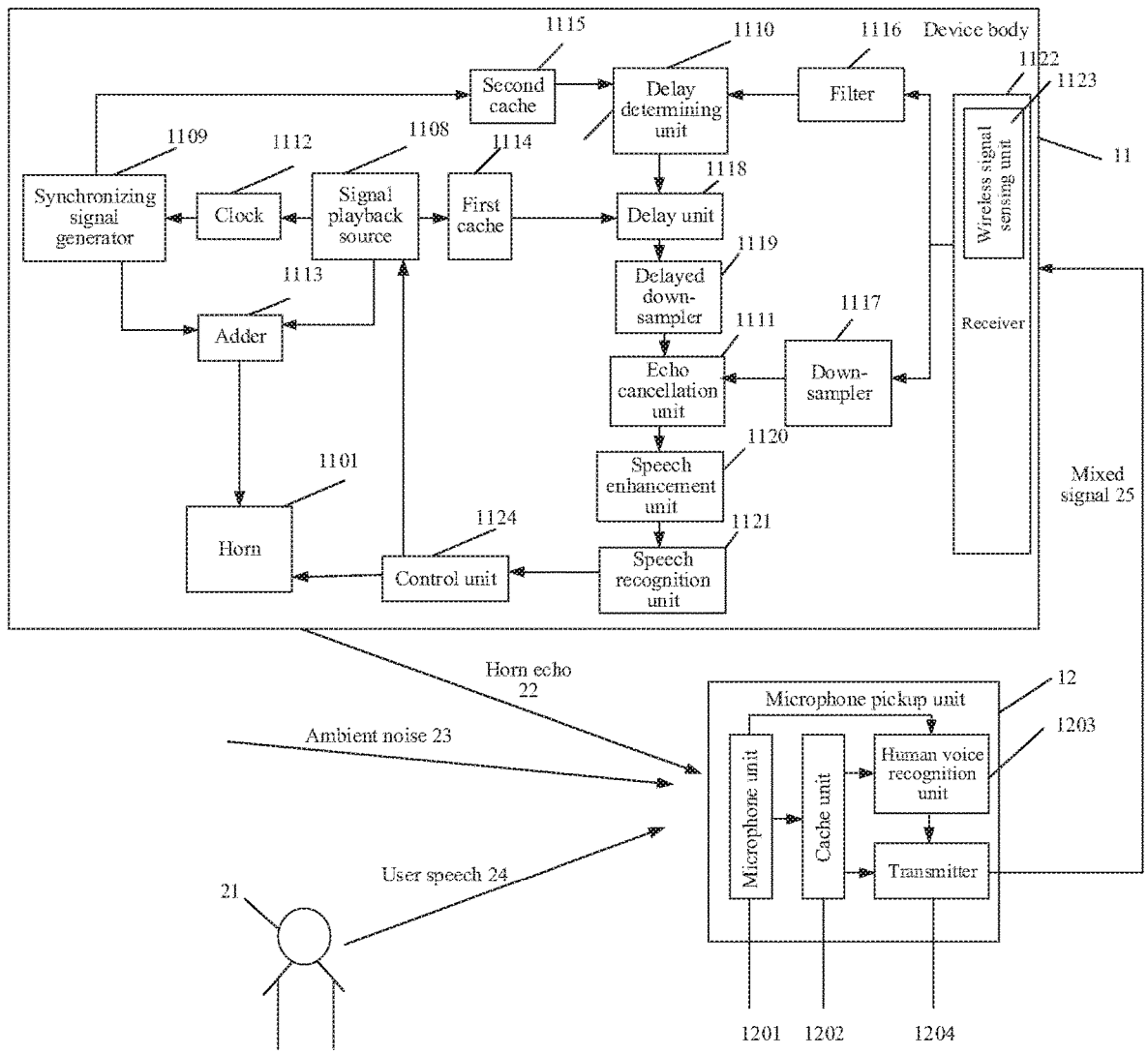
FIG. 6 is a schematic structural diagram of a far-field pickup device according to an embodiment of the disclosure.

In an example implementation, the synchronizing signal generator 1109 may include a clock circuit inside, which may extract a clock in the sound signal generated by the signal playback source 1108, and the extracted clock is used as a basis for generating the signal synchronized with the sound signal. A clock circuit 1112 may also be arranged outside the synchronizing signal generator 1109. As shown in FIG. 6, the clock circuit 1112 is arranged between the signal playback source 1108 and the synchronizing signal generator 1109. After the clock circuit 1112 extracts a clock from the sound signal generated by the signal playback source 1108, the clock is used as a basis to generate the signal that is at the second frequency band and that is synchronized with the sound signal.

In an embodiment, the second frequency band is bound to be within the range that human ears cannot hear. If the synchronizing signal of the second frequency band is a sound signal that may be heard by human ears, the synchronizing signal will be superimposed with the sound signal generated by the playing playback source 1108 and then played by the horn 1101. In this case, the synchronizing signal will be played together with the sound signal and heard by the user, thereby causing interference to hearing of the sound signal by the user.

In an embodiment, the second frequency band may be an ultrasonic frequency band, and the synchronizing signal generator 1109 may be an ultrasonic synchronizing signal generator. Since the ultrasonic frequency band is inaudible to human ears, there may not be any interference to user's hearing of the sound signal. A sampling frequency of the synchronizing signal is exactly the same as the sound signal, but energy of the synchronizing signal is all at the ultrasonic frequency band. If the sampling frequency of the sound signal is 48 KHz, the ultrasonic frequency band from 21 KHz to 23 KHz may be selected. If the sampling frequency of the sound signal is 96 KHz, an ultrasonic frequency band (but less than 48 KHz) higher than 23 KHz may be selected.

In an embodiment, in order to obtain better interference immunity and good autocorrelation characteristics, the synchronizing signal is a pseudo-random sequence after carrier modulation. Since the synchronizing signal is used for determining the time delay between the sound signal generated by the signal playback source 1108 and the mixed signal 25 received by the device body 11 and use this time delay for echo cancellation, good interference immunity and good autocorrelation characteristic are required. The pseudo-random sequence after carrier modulation may be expressed as:

$$s(t)=n(t)\sin(f_s t) \quad \text{Formula 1}$$

n(t) is a pseudo-random sequence, $f_s$ is a carrier frequency within the ultrasonic frequency range, and s(t) is a pseudo-random sequence after carrier modulation.

In an embodiment, the pseudo-random sequence is selected based on at least one of the following parameters:
an autocorrelation function of a pseudo-random sequence;
a period of the pseudo-random sequence; and
a spectral width of the autocorrelation function of the pseudo-random sequence.

In addition, the frequency of a carrier may be selected based on a distance of 20 KHz.

It would be understood that the pseudo-random sequence after carrier modulation that satisfies Formula 1 may achieve better interference immunity and good autocorrelation characteristics. If the pseudo-random sequence and the frequency of the carrier are selected as described above, the interference immunity may be further improved and good autocorrelation characteristics may be obtained.

For the autocorrelation function of the pseudo-random sequence n(t), a shorter distance between the autocorrelation function and the impact function leads to a better result. In an embodiment, if the autocorrelation function of the pseudo-random sequence n(t) may be approximated by an impact function, it is considered that the interference immunity and autocorrelation characteristics of the pseudo-random sequence n(t) are sufficiently good.

The period of the pseudo-random sequence n(t) needs to be significantly greater than a time delay between a time at which the signal playback source 1108 generates the sound signal and a time at which the mixed signal 25 is received by the device body 11. This is because in a case that the period of the pseudo-random sequence n(t) is less than the time delay between the time at which the signal playback source 1108 generates the sound signal and the time at which the mixed signal 25 is received by the device body 11, and the delay determining unit 1110 determines the time delay between the second frequency band component in the mixed signal 25 transmitted back by the microphone pickup unit 12 and the synchronizing signal, the determined time delay is inaccurate due to the time delay including periods of a plurality of synchronizing signals.

In an embodiment, the following formula needs to be satisfied:

$$T \geq \mu t1 \quad \text{Formula 2}$$

T is a period of a pseudo-random sequence n(t), and t1 is an average value of time delays that are measured a plurality of times and that are between a time at which the signal playback source 1108 generates the sound signal and a time at which the mixed signal 25 is received by the device body 11. A method in which the time delay is measured may be: making the signal playback source 1108 generate a test sound signal, recording a time at which the test sound signal is generated, recording a time at which the device body 11 receives the mixed signal 25 sent by the microphone pickup unit 12, and comparing the recorded two times to obtain a time delay. The time delay may be measured a plurality of times, and the average value of the time delays obtained a plurality of times is calculated. μ is a constant and may be set in advance, for example, set to 3 or 4.

The spectral width of the autocorrelation function of the pseudo-random sequence n(t) may be required to be greater than a predetermined spectrum width threshold, so that the interference immunity and autocorrelation characteristics of the pseudo-random sequence n(t) may be sufficiently good. The preset spectral width threshold may be preset by the user.

The frequency of the carrier may be selected based on a distance of 20 KHz. In an embodiment, the following formula needs to be satisfied:

$$|f_s - 20 \text{ kHz}| \geq Q \quad \text{Formula 3}$$

Q is a distance threshold with the unit of KHz. When formula 3 is satisfied, the addition of the synchronizing signal will not interfere with quality of the sound signal played by the signal playback source 1108.

The horn 1101 is a loudspeaker, which is a circuit device that converts a sound signal into sound. In the embodiments of the disclosure, the horn is configured to play a superimposed signal of the sound signal and the synchronizing signal, the superimposed signal serving as the sound signal played by the device body 11. As shown in FIG. 5, in an embodiment, the synchronizing signal outputted by the synchronizing signal generator 1109 and the sound signal outputted by the signal playback source 1108 may be respectively input to dual input terminals of the horn 1101, and a sound signal that represents the sum of two signals is outputted at an output terminal of the horn 1101. In another embodiment, as shown in FIG. 6, the horn 1101 has only a single input terminal. The sound signal outputted by the signal playback source 1108 and the synchronizing signal outputted by the synchronizing signal generator 1109 are first provided to an adder 1113 for superposition, and the superimposed sound signal is outputted to the horn 1101. The horn 1101 converts the sound signal into sound for playback.

The sound played by the speaker 1101 includes not only the to-be-played sound in the first frequency band that may be heard by human ears, but also the component converted by the synchronizing signal in the second frequency band that cannot be heard by human ears, such as ultrasound. The component converted from the synchronizing signal will not interfere with the user's hearing, and when the microphone pickup unit 12 sends the collected mixed signal 25 back to the device body 11, the component of the second frequency band and the synchronizing signal generated by the synchronizing signal generator 1109 may be compared in time, to obtain the time delay between a time at which the synchronizing signal is generated and a time at which the synchronizing signal is received by the device body 11. The time delay is also the time delay between a time at which the signal playback source 1108 generates the sound signal and a time at which the mixed signal 25 is received by the device body 11. Therefore, the sound signal may be delayed by the time delay, and the delayed sound signal is used for echo cancellation, thereby obtaining the collected human voice signal, resolving the problem that a microphone signal and an echo reference signal cannot be synchronized, and improving speech recognition performance.

A sound signal p(t) played by the horn 1101 is actually the sum of a synchronizing signal s(t) and a sound signal r(t), that is $$P(t)=s(t)+r(t) \qquad \text{Formula 4}$$

Due to the transmission loss, when the sound signal played by the horn 1101 is received by the microphone pickup unit 12, the sound signal received by the microphone pickup unit 12 is changed into:

$$m(t)=g(t)*s(t)+k(t)*r(t) \qquad \text{Formula 5}$$

m(t) represents the sound signal received by the microphone pickup unit 12, g(t) is a transfer function of s(t) transmitted between the horn 1101 and the microphone pickup unit 12, and k(t) is a transfer function of r(t) transmitted between the horn 1101 and the microphone pickup unit 12.

The microphone pickup unit 12 collects user speech 24, an echo 22 (a horn echo) of a sound signal played by the horn 1101 after being transmitted in space, and interference noise 23 (ambient noise) in the environment. The user speech 24 is the sound made by the user, which may include a speech control command that the user operates the smart speaker, such as "turn up or down the sound". The echo 22 of the sound signal played by the horn 1101 after being transmitted in space refers to a sound that is played by the horn 1101 when reaching the microphone pickup unit 12 after being transmitted in space. The space is the space in the environment (for example, a room) in which the horn 1101 and the microphone pickup unit 12 are located. Propagation in space includes linear propagation, as well as propagation through the sound signal reaches the microphone pickup unit 12 again through reflection, diffraction, and the like of a wall, a window, and the like. The interference noise 23 in the environment is background sounds such as environmental noise, a sound of howling air, and the like. The microphone pickup unit 12 shown in FIG. 5 includes a microphone unit 1201. The microphone unit 1201 is a sound-electrical signal conversion unit, which may convert sound into an electrical signal representing the sound, especially into a digital signal. The digital signal is actually a mixed signal 25 converted by superimposing user speech, interference noise in the environment, an echo of the sound signal played by the smart speaker.

The microphone unit 1201 of the microphone pickup unit 12 transmits the mixed signal 25 to the device body 11. The delay determining unit 1110 in the device body 11 may determine the time delay between the component of the second frequency band in the mixed signal 25 and the synchronizing signal. In an embodiment, the delay determining unit 1110 may be equipped with a filtering unit itself. Since the first frequency band in which the sound signal is located is different from the second frequency band in which the synchronizing signal is located, the filtering unit may filter a component of the second frequency band from the mixed signal 25. The component may be a delay signal generated after a series of processes from generating of the synchronizing signal to being received by the microphone pickup unit 12 and then being transmitted back by the microphone pickup unit 12 to the device body 11. By comparing the delay signal with the initially generated synchronizing signal, a time delay between the time at which the synchronizing signal is generated and the time at which the synchronizing signal is received again by the device body 11 may be determined.

In another embodiment, the delay determining unit 1110 may not be equipped with a filtering unit, but a filter 1116 may be placed in front of the delay determining unit, as shown in FIG. 6. The filter 1116 may filter out the component of the second frequency band from the received mixed signal 25 for the delay determining unit 1110 to determine the delay time. In an embodiment, a sampling frequency of the filter 1116 is consistent with a sampling frequency of the synchronizing signal and a sampling frequency of the mixed signal received by the device body 11. The filter delay caused by the filter 1116 is $\tau_f$.

The delay determining unit 1110 compares the component of the second frequency band with the synchronizing signal generated by the synchronizing signal generator 1109 in time to determine the time delay. Therefore, the synchronizing signal that has been generated by the synchronizing signal generator 1109 needs to be recorded or cached. In an embodiment, a time at which the synchronizing signal generator 1109 generates the synchronizing signal may be recorded by adding a timestamp. When the synchronizing signal generator 1109 generates the synchronizing signal, a timestamp is added to the synchronizing signal, for example, a part of the synchronizing signal is occupied by the timestamp. After the mixed signal 25 is received by the device body 11, the component of the filtered second frequency band still includes the timestamp. In this case, the delay determining unit 1110 may determine the time delay according to a time difference between a time at which the component of the second frequency band outputted by the filter 1116 is received and the timestamp.

In another embodiment, as shown in FIG. 6, a second cache 1115 is configured to cache the synchronizing signal generated by the synchronizing signal generator 1109, and thus, the synchronizing signal that has been generated may not disappear. In the second cache 1115, the synchronizing signal generated by the synchronizing signal generator 1109 may be stored based on a timeline of generation. After the component of the second frequency band outputted by the filter 1116 is received, the component is matched with the synchronizing signal that is generated by the synchronizing signal generator 1109 and cached in the second cache. If it is found that the component matches a certain segment of the synchronizing signal generated by the synchronizing signal generator 1109, the generation time of this segment is read out and subtracted from the time at which the component of the second frequency band is received, thereby obtaining the time delay. Compared with the method of adding a timestamp, according to this embodiment, since there is no need to add the timestamp and occupy a part of the synchronizing signal, network resources to be occupied may be reduced.

In an embodiment, a duration for which the second cache 1115 caches the synchronizing signal is at least a sum of a duration for which the sound signal played by the horn 1101 is transmitted to the microphone pickup unit 12 and a duration for which the sound signal outputted by the microphone pickup unit 12 is transmitted back to the device body 11. In an actual operation, the signal playback source 1108 may play a test sound signal, then record a time at which the horn 1101 plays the test sound signal, and then record a time at which the microphone pickup unit 12 receives the test sound signal, so that the duration for which the sound signal played by the horn 1101 is transmitted to the microphone pickup unit 12 may be calculated. Then, the time at which the microphone pickup unit 12 outputs the mixed signal 25 including the sound signal is recorded, and the time at which the mixed signal 25 is received by the receiver 1122 is recorded, to calculate the duration for which the sound signal outputted by the microphone pickup unit 12 is transmitted back to the device body 11. Then, for the test sound signal, the sum of the duration for which the sound signal played by the horn 1101 is transmitted to the microphone pickup unit 12 and the duration for which the sound signal outputted by the microphone pickup unit 12 is transmitted back to the device body 11 is calculated. For a plurality of test sound signals, after a plurality of sums are obtained, an average value of the plurality of sums is determined, and then capacity of the second cache 1115 is set to be greater than or equal to the average value.

The duration for which the second cache 1115 caches the synchronizing signal is set to be at least the sum of the duration for which the sound signal played by the horn 1101 is transmitted to the microphone pickup unit 12 and the duration for which the sound signal outputted by the microphone pickup unit 12 is transmitted back to the device body 11. To describe the advantages of this method, a comparative example is assumed in which the duration for which the second cache 1115 caches the synchronizing signal is set to be less than the sum of the duration for which the sound signal played by the horn 1101 is transmitted to the microphone pickup unit 12 and the duration for which the sound signal outputted by the microphone pickup unit 12 is transmitted back to the device body 11, and the delay determining unit 1110 searches the second cache for a matched segment in the synchronizing signal according to the component of the second frequency band filtered by the filter 1116. In such a case, the matched segment may have been squeezed out of the second cache because the synchronizing signal is played through the horn 1101, received by the microphone pickup unit 12, and transmitted back to the device body 11, and the time for filtering and performing other operations by the filter 1116 of the device body 11 exceeds the capacity of the second cache 1115. When the delay determining unit 1110 searches the second cache 1115 for the synchronizing signal segment corresponding to the filtered second component, the synchronizing signal segment has disappeared or partially disappeared from the second cache.

In another embodiment, the time delay between the synchronizing signal and the component of the second frequency band may be determined by using a cross-correlation method.

In this embodiment, the delay determining unit 1110 may determine, by using the following operation, a time delay between a second frequency band component in the mixed signal 25 transmitted back by the microphone pickup unit 12 and the synchronizing signal:
 determining a time corresponding to a maximum value of a cross-correlation function between the second frequency band component in the mixed signal 25 transmitted back by the microphone pickup unit 12 and the synchronizing signal; and using the time as the time delay.

A data stream outputted by the filter 1116 is set to be h(t), and the synchronizing signal generated by the synchronizing signal generator 1109 cached in the second cache 1115 is s(t). After the delay determining unit 1110 receives h(t), a method for determining the time delay r(t) between h(t) and s(t) is calculating the cross-correlation between the two signals:

$$\varphi(\tau)=|\Sigma h(t)s(t-r)| \quad \text{Formula 6}$$

$\varphi(\tau)$ is a cross-correlation function of h(t) and s(t). The time corresponding to the maximum value of the function $\varphi(\tau)$ may be used as an estimated value $\tau'_1(t_1)$ of the time delay between the two signals h(t) and s(t).

In an embodiment, in a case that the synchronizing signal is a pseudo-random sequence after carrier modulation, before the time delay between the second frequency band component and the synchronizing signal is determined by calculating the cross-correlation function of the synchronizing signal and the second frequency band component in the mixed signal 25 transmitted back by the microphone pickup unit 12, the synchronizing signal is demodulated. The cross-correlation function is a cross-correlation function between the demodulated synchronizing signal and the second frequency band component. The advantage of demodulating first is that the time delay determined by calculating the cross-correlation function may be made more accurate.

In this embodiment, the time $\tau'_1(t_1)$ corresponding to the maximum value of the cross-correlation function between the foregoing two signals h(t) and s(t) is used as the time delay between the second frequency band component in the mixed signal 25 transmitted back by the microphone pickup unit 12 and the synchronizing signal.

In another embodiment, the delay determining unit 1110 may determine, by using the following operations, a time delay between a second frequency band component in the mixed signal 25 transmitted back by the microphone pickup unit 12 and the synchronizing signal:
 determining a time corresponding to a maximum value of a cross-correlation function between the second frequency band component in the mixed signal 25 transmitted back by the microphone pickup unit 12 and the synchronizing signal; and
 using, as the time delay, a sum of the determined time and a filter delay caused by the filter 1116.

That is, a sum $\tau_1(t)$ of the time $\tau'_1(t_1)$ corresponding to the maximum value of the cross-correlation function between the foregoing two signals h(t) and s(t) and the filter delay $\tau_f$ caused by the filter 1116 is used as the time delay between the second frequency band component in the mixed signal 25 transmitted back by the microphone pickup unit 12 and the synchronizing signal. That is:

$$\tau_1(t)=\tau'_1(t_1)+\tau_f \quad \text{Formula 7}$$

The advantage of this embodiment is that the influence of the filtering of the filter on the time delay is considered, thereby improving the accuracy of determining the time delay and performing echo cancellation.

Then, the echo cancellation unit 1111 performs, based on the mixed signal 25 transmitted back by the microphone pickup unit 12, echo cancellation by using the sound signal delayed according to the determined time delay, to obtain the collected human voice signal. First, the echo cancellation unit 1111 needs to delay the sound signal generated by the signal playback source 1108 based on the determined time delay. In the embodiment shown in FIG. 5, the signal delay may be implemented by using a delay circuit built in the echo cancellation unit 1111. In another embodiment, the signal delay may be implemented by using a delay unit 1118 disposed between the delay determining unit 1110 and the echo cancellation unit 1111, as shown in FIG. 6. The delay unit 1118 is configured to delay the sound signal by using the time delay determined by the delay determining unit 1110, for the echo cancellation unit to 1111 to perform echo cancellation.

Regardless of a built-in delay circuit or a separate delay unit 1118, when a determined time delay is used for delaying the sound signal, it is needed to find the sound signal generated by the signal playback source 1108 at that time. In this embodiment, the device body 11 further includes: a first cache 1114 configured to cache a sound signal generated by the signal playback source 1108. As shown in FIG. 6, the first cache 1114 may be connected between the signal playback source 1108 and the delay unit 1118. In this way, after the signal playback source 1108 generates a sound signal, the sound signal may be cached in the first cache 1114. After the delay determining unit 1110 determines the time delay, the delay unit 1118 may use the time delay to delay the sound signal in the first cache 1114.

In an embodiment, a duration for which the first cache 1114 caches the sound signal is at least a sum of a duration for which the sound signal played by the horn 1101 is transmitted to the microphone pickup unit 12 and a duration for which the sound signal outputted by the microphone pickup unit 12 is transmitted back to the device body 11. In an actual operation, the signal playback source 1108 may play a test sound signal, then record a time at which the horn 1101 plays the test sound signal, and then record a time at which the microphone pickup unit 12 receives the test sound signal, so that the duration for which the sound signal played by the horn 1101 is transmitted to the microphone pickup unit 12 may be calculated. Then, the time at which the microphone pickup unit 12 outputs the mixed signal 25 including the sound signal is recorded, and the time at which the mixed signal 25 is received by the receiver 1122 is recorded, to calculate the duration for which the sound signal outputted by the microphone pickup unit 12 is transmitted back to the device body 11. Then, for the test sound signal, the sum of the duration for which the sound signal played by the horn 1101 is transmitted to the microphone pickup unit 12 and the duration for which the sound signal outputted by the microphone pickup unit 12 is transmitted back to the device body 11 is calculated. For a plurality of test sound signals, after a plurality of sums are obtained, an average value of the plurality of sums is determined, and then capacity of the first cache 1114 is set to be greater than or equal to the average value.

The duration for which the first cache 1114 caches the sound signal is set to at least the sum of the duration for which the sound signal played by the horn 1101 is transmitted to the microphone pickup unit 12 and the duration for which the sound signal outputted by the microphone pickup unit 12 is transmitted back to the device body 11. To explain the advantages of this method, it is assumed a comparative example in which the duration for which the first cache 1114 caches the sound signal is set to be less than the sum of the duration for which the sound signal played by the horn 1101 is transmitted to the microphone pickup unit 12 and the duration for which the sound signal outputted by the microphone pickup unit 12 is transmitted back to the device body 11. In such a case, when the delay unit 1118 delays playing the corresponding synchronizing signal segment according to the time delay determined by the delay determining unit 1110, the corresponding synchronizing signal segment may have been removed from the first cache 1114.

In an embodiment, the echo cancellation unit 1111 directly performs, based on the mixed signal 25 transmitted back by the microphone pickup unit 12, echo cancellation by using the sound signal delayed according to the determined time delay. Although the mixed signal 25 transmitted back by the microphone pickup unit 12 further includes a component of the second frequency band, since the component of the second frequency band is inaudible to human ears, the received mixed signal 25 transmitted back by the microphone pickup unit 12 may also be directly transmitted to the echo cancellation unit 1111 for echo cancellation. However, in another embodiment, as shown in FIG. 6, the mixed signal 25 transmitted back by the microphone pickup unit 12 is sent to a down-sampler 1117 first, and then sent to the echo cancellation unit 1111 for echo cancellation through processing by the down-sampler 1117. The down-sampler 1117 is configured to convert, into a sampling frequency (for example, 16 KHz) for human voice recognition from a sampling frequency (for example, 48 KHz or 96 KHz) for playback, a sampling frequency of the mixed signal 25 transmitted back by the microphone pickup unit 12, for the echo cancellation unit 1111 to perform echo cancellation. Through processing by the down-sampler 1117, the component of the second frequency band is naturally eliminated and may not be provided to the echo cancellation unit 1111. In this way, the echo cancellation unit 1111 may perform echo cancellation on the received signal in the first frequency band (the frequency band consistent with that of the sound signal) by using the sound signal delayed according to the determined time delay, thereby improving quality of the echo cancellation. The echo cancellation unit 1111 may be implemented by using an echo cancellation circuit, or the like.

In an embodiment, as shown in FIG. 6, the sound signal outputted from the delay unit 1118 and delayed according to the determined time delay also passes through a delayed down-sampler 1119. The delayed down-sampler 1119 converts a sampling frequency into a sampling frequency for human voice recognition from a sampling frequency for playback, for the echo cancellation unit 1111 to perform echo cancellation.

In addition, in an embodiment, as shown in FIG. 6, the device body 11 is further provided with a receiver 1122 configured to receive the mixed signal 25 transmitted back by the microphone pickup unit 12. After the receiver 1122 receives the mixed signal 25 transmitted back by the microphone pickup unit 12, a part of the mixed signal is transmitted to the filter 1116 to filter out the component of the second frequency band for determining the time delay, and the other part is transmitted to the echo cancellation unit 1111 for echo cancellation through the down-sampler 1117.

In addition, as shown in FIG. 6, in an embodiment, the device body 11 further includes: a speech enhancement unit 1120 connected to an output of the echo cancellation unit 1111 and configured to remove interference noise 23 in the environment in the output of the echo cancellation unit 1111 by using algorithms such as signal separation and speech noise reduction through beamforming. In addition, as described in detail later, when the microphone pickup unit 12 has a plurality of microphone units 1201, that is, when the mixed signal 25 transmitted by the microphone pickup unit 12 to the receiver 1122 is a multi-channel mixed signal, the speech enhancement unit 1120 is further configured to combine user speech collected by the multi-channel microphone unit 1201 on which the echo cancellation unit 1111 completes the echo cancellation, to obtain an enhanced human voice signal.

In addition, as shown in FIG. 6, in an embodiment, the device body 11 further includes: a speech recognition unit 1121 configured to perform speech recognition on the collected human voice signal. In FIG. 6, the speech recognition unit 1121 is connected to the output of the speech enhancement unit 1120, performs speech recognition on the enhanced human voice signal, and recognizes the signal as texts.

In addition, as shown in FIG. 6, in an embodiment, the device body 11 further includes: a control unit 1124 configured to perform a control action based on a control command in a speech recognition result. In FIG. 6, the control unit is connected to the output of the speech recognition unit 1121, and performs the control action based on the recognized texts outputted by the speech recognition unit 1121. For example, the control unit 1124 may store language modes (e.g., verbal phrases in one or more languages) corresponding to various actions, for example, corresponding to an action of "turning up the volume", and the corresponding language modes may include a plurality of language modes such as "turn up the volume", "louder", "even louder", and the like. The action and the corresponding language mode are stored in the language mode and action comparison table in the control unit 1124 in advance, so that the control unit 1124 may match the speech recognition result with the language mode in the comparison table after receiving the speech recognition result, search the comparison table for the action corresponding to the matched language mode, and perform the action.

In the application scenario of the smart speaker shown in FIG. 1A, the performed control action is a control action for playback of the speaker, for example, "play XXX", "turn up the volume", and so on.

In the application scenario of the smart speaker shown in FIG. 1B, the performed control action is a control action for playback of the television, for example, "switch to channel XX", "turn up the volume", and so on.

In the application scenario of the voice-activated intelligent navigation shown in FIG. 1C, the performed control action is a control action for the navigation, for example, "changing to a destination XXX", "turning up the navigation sound", "changing the zooming of navigation display", and the like.

In the application scenario of the KTV playback system shown in FIG. 1D, the speech recognition unit 1121 and the control unit 1124 may not be required.

An example of a structure of the microphone pickup unit 12 is described in detail below with reference to FIG. 6.

In an embodiment, the microphone pickup unit 12 has a transmitter 1204 configured to transmit, to the device body 11, the collected user speech 24, an echo 22 (a horn echo) of a sound signal played by the device body 11 and transmitted to the microphone pickup unit 12, interference noise 23 (ambient noise) in the environment. The transmitter 1204 has a standby mode and a transmission mode. In the standby mode, the transmitter 1204 does not operate. When a human voice signal is recognized from the signal sent by the microphone unit 1201, the transmitter 1204 is switched to the transmission mode from the standby mode. In the microphone pickup unit 12, the transmitter 1204 consumes most of power. Since no or little power is consumed in the standby mode, the transmitter 1204 enters into the transmission mode only when it is recognized that the microphone unit 1201 collects a human voice, and the transmitter 1204 is in the standby mode when the human voice is not recognized, which greatly reduces standby power consumption of the microphone pickup unit 12, and resolves the problem of high power consumption of the microphone pickup unit 12.

In an embodiment, as shown in FIG. 6, the microphone pickup unit 12 has a microphone unit 1201, a human voice recognition unit 1203, and a cache unit (or a cache) 1202.

The microphone unit 1201 receives the user speech 24, the echo 22 of a sound signal played by the device body 11 that is transmitted in space, and the interference noise 23 in the environment, and converts the received sound signal into a digital signal. In an embodiment, a sampling frequency of the microphone unit 1201 is consistent with sampling frequencies of the sound signal and the synchronizing signal, and is greater than or equal to 2 times of the highest frequency of the synchronizing signal. The advantage of selecting the sampling frequency in this manner is that frequency aliasing may be prevented and sampling quality may be improved, thereby improving the quality of the collected human voice signals in the embodiments of the disclosure.

The cache unit 1202 is configured to cache the signal collected by the microphone unit 1201, that is, the echo 22 of the sound signal played by the device body 11 that is transmitted in space, and the interference noise 23 in the environment, and converts the received sound signal into a digital signal. In an embodiment, the cache unit 1202 is a cyclic cache unit, that is, when capacity of data received by the cache unit 1202 exceeds cache capacity Tc of the cache unit 1202, data received by the cache unit 1202 earlier may be removed according to the first-in-first-out principle, so that the data capacity cached by the cache unit 1202 will be always not larger than the cache capacity Tc. In an embodiment, the cache capacity Tc is set to be not less than a detection delay caused by the voice recognition of the human voice recognition unit 1203.

The human voice recognition unit 1203 is configured to: recognize a human voice from an output of the microphone unit 1201, trigger, in a case that the human voice is recognized, the transmitter 1204 to enter into the transmission mode, and convert, into digital signals for transmission, the echo 22 of the sound signal played by the device body 11 and cached by the cache unit 1202 in space and the interference noise 23 in the environment. The human voice recognition unit 1203 may be implemented by using a human voice recognition module.

The purpose of including the cache unit 1202 in the microphone pickup unit 12 is that: the existing human voice recognition technology requires certain calculation processing to detect human voice from the input sound signal, and there is a delay caused by detection. In a case that the human voice recognition unit 1203 recognizes a human voice and triggers the transmitter 1204 to enter into the transmission mode, and the human voice is not cached, during a period from a time at which the human voice signal is received to a time at which the human voice signal is recognized by the human voice recognition unit 1203, the transmitter 1204 does not enter in the transmission mode and does not operate, and the human voice signal is not transmitted by the transmitter 1204. After the human voice recognition unit 1203 recognizes the human voice signal, the human voice signal is to be transmitted by the transmitter 1204. In this way, a human voice signal during a period of time will be lost. By first storing the human voice signal in the cache unit 1202 for a period of time, when the human voice recognition unit 1203 recognizes the human voice signal, the human voice signal cached by the cache unit 1202 is released, avoiding signal loss during the period of human voice recognition. The cache capacity Tc may be set to be not less than the detection delay caused by the human voice recognition unit 1203 performing human voice recognition, which may ensure that the human voice signal will not be lost at least during the period of delay detection, thereby improving the integrity of the finally obtained human voice signal.

In an embodiment, in a case that the human voice recognition unit 1203 fails to recognize the human voice signal, and the human voice signal is recognized from the mixed signal 25 sent by the microphone unit 1201, a start trigger is sent to the transmitter 1204. When receiving the start trigger, the transmitter 1204 enters into the transmission mode from the standby mode.

In an embodiment, in a case that the human voice recognition unit 1203 recognizes the human voice signal, and the human voice signal cannot be recognized from the mixed signal 25 sent by the microphone unit 1201, a stop trigger is sent to the transmitter 1204. When receiving the stop trigger, the transmitter 1204 enters into the standby mode from the transmission mode.

Figure 7:
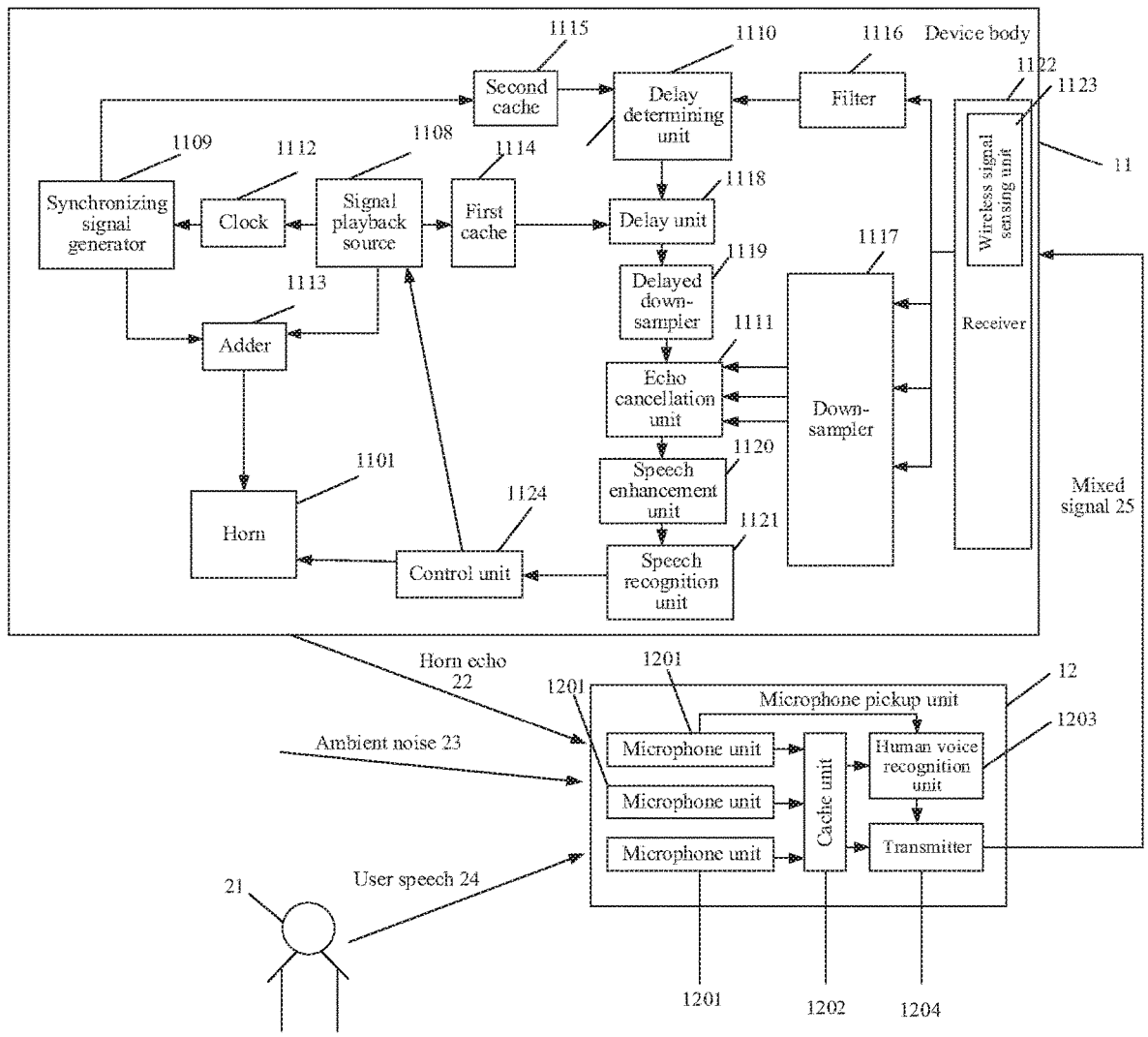
FIG. 7 is a schematic structural diagram of a far-field pickup device according to an embodiment of the disclosure.

In an embodiment, in order to improve the accuracy of the collected human voice signals, the microphone pickup unit 12 may include a plurality of microphone units 1201. One of the microphone units is connected to the human voice recognition unit 1203, for example, the first microphone unit may be specified to be connected to the human voice recognition unit 1203, as shown in FIG. 7. Certainly, it would be understood by a person skilled in the art that the second or third microphone unit may also be specified to be connected to the human voice recognition unit 1203. The human voice recognition unit 1203 triggers the transmitter 1204 to enter into the transmission mode when detecting a human voice from the output of the connected microphone unit 1201, and transmits the mixed signal collected by each of the microphone units 1201 and cached by the cache unit 1202.

The plurality of microphone unit 1201 simultaneously collects the user speech 24, the echo 22 of the sound signal played by the horn 1101, and the interference noise 23 in the environment. A sound signal p(t) played by the horn 1101 is actually the sum of a synchronizing signal s(t) and a sound signal r(t), that is, in a case that formula 4 is satisfied, sound signals received by the $i^{th}$ microphone unit 1201 ($1 \le i \le n$, where n is a total number of microphone units) are:

$$m_i(t) = g_i(t) * s(t) + k_i(t) * r(t) \qquad \text{Formula 8}$$

$m_i(t)$ represents a sound signal received by the $i^{th}$ microphone unit 1201, $g_i(t)$ is a transfer function of s(t) transmitted between the horn 1101 and the $i^{th}$ microphone unit 1201, and $k_i(t)$ is a transfer function of r(t) transmitted between the horn 1101 and the $i^{th}$ microphone unit 1201.

Since the plurality of microphone units 1201 simultaneously collect the user speech 24, the horn echo 22, and the interference noise 23 in the environment, collected multi-channel signals will be obtained. The collected multi-channel signals will be processed separately in the device body 11, through echo cancellation, respective sound signals will be generated, and finally these human voice signals will be combined for processing. Therefore, the obtained human voice signals are enhanced, thereby overcoming a disadvantage that the user speech signals collected by the single microphone unit 1201 are likely to be weak and easily affected by performance deterioration of the microphone unit 1201 or other components in the circuit. Since the microphone units 1201 are all located in the same microphone pickup unit 12, it may be considered that the microphone units may receive human voice signals almost at the same time. Therefore, any one of the microphone units may be allowed to be connected to the human voice recognition unit 1203, to facilitate recognition of human voices by the human voice recognition unit 1203.

Figure 8:
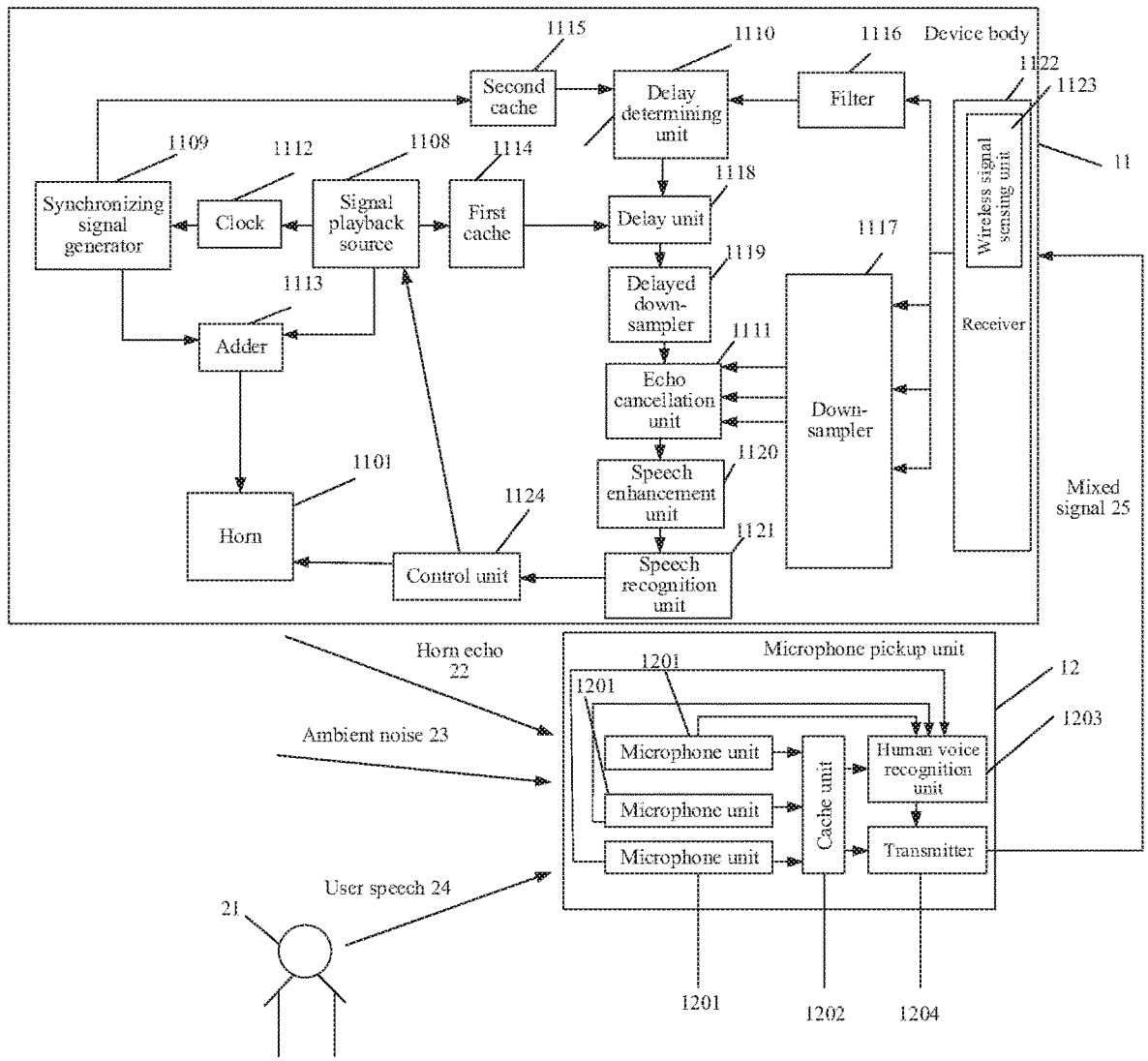
FIG. 8 is a schematic structural diagram of a far-field pickup device according to an embodiment of the disclosure.

Although the microphone units 1201 located in the same microphone pickup unit 12 may receive human voice signals almost simultaneously (e.g., almost in real time), a slight time difference in receiving the human voice signals between the microphone units may be further considered in order to achieve even higher accuracy. Therefore, in another embodiment, as shown in FIG. 8, the human voice recognition unit 1203 may be connected to each of the microphone units 1201. In a case that the human voice recognition unit 1203 triggers the transmitter 1204 to enter into the transmission mode when detecting a human voice from the output of any one of the connected microphone units 1201, and converts, into digital signals for transmission, the human voice signal collected by each of the microphone units 1201 and cached by the cache unit 1202, the interference noise in the environment, and the horn echo. In this way, the microphone unit 1201 that receives the human voice signal earliest in the plurality of microphone units 1201 will send the generated digital signal to the human voice recognition unit 1203 earliest, so that the human voice recognition unit 1203 may start the recognition. When the human voice recognition unit 1203 recognizes the human voice signal, the transmitter 1204 is triggered to start sending the digital signals. In this way, the human voice recognition unit 1203 may perform recognition in response to the user speech received earliest, and trigger the transmitter 1204 to enter into the transmission mode, so as to start transmission of the digital signals as soon as possible.

In FIGS. 7 and 8, since there are a plurality of microphone units 1201, the cache unit 1202 also caches multi-channel digital signals obtained by converting the collected human voice signals, the interference noise in the environment, and the horn echo received by the plurality of microphone units 1201. When the human voice recognition unit 1203 recognizes the human voice and triggers the transmitter 1204 to enter into the transmission mode, the transmitter 1204 may respectively send the multi-channel digital signals to the receiver 1122 of the device body 11 through a plurality of channels (such as wireless communication channels).

In an embodiment, the transmitter 1204 may multiplex the multi-channel digital signals before transmission into a communication channel, and send the signals to the receiver 1122. The multiplexing method includes, for example, encapsulating a packet, that is, adding an identifier (ID) to the digital signal of each channel, then encapsulating the digital signal into a sub-packet, encapsulating all the digital signals into a plurality of sub-packets, encapsulating the plurality of sub-packets into a large packet, and transmitting the large packet to the receiver 1122 through a channel. Other multiplexing methods such as time division multiplexing and frequency division multiplexing may also be adopted. This embodiment facilitates reduction in channel occupation and proper use of resources.

In an embodiment, the receiver 1122 in the device body 11 may demultiplex the multiplexed signal sent by the transmitter 1204, that is, parse out each digital signal from the multiplexed signal, that is, various digital signals obtained by converting the collected human voice signal, the interference noise in the environment, and the horn echo by each microphone unit 1201. The demultiplexing method includes, for example, decapsulating a packet, that is, decapsulating the large packet to take out each sub-packet, then de-encapsulating each sub-packet, and assigning, to a channel corresponding to the identifier, the content extracted from the sub-packet according to an identifier (ID) of the sub-packet, so that the digital signals may be transmitted, according to different channels, to the down-sampler 1117 for down sampling.

In order to reduce the power consumption of the device body 11, in an embodiment, the receiver 1122 of the device body 11 also has a standby mode and a receiving mode. The receiver 1122 does not operate in the standby mode, and the receiver 1122 is switched to the receiving mode from the standby mode in a case that a wireless signal is sensed. In the standby mode, the receiver 1122 does not operate and thus does not consume power, and only in the receiving mode, the receiver 1122 consumes power, thereby greatly reducing the power consumption of the device body 11.

In an embodiment, as shown in FIG. 6, the receiver 1122 has a wireless signal sensing unit 1123, and when the wireless signal sensing unit 1123 senses a wireless signal, the receiver 1122 enters into the transmission mode from the standby mode. The wireless signal sensing unit 1123 may be implemented by using a wireless signal sensor, or the like. In an embodiment, after the wireless signal sensing unit 1123 senses the wireless signal, a start trigger is generated. In response to the start trigger, the receiver 1122 enters into the transmission mode from the standby mode. After the wireless signal sensing unit 1123 senses that the wireless signal disappears, a stop trigger is generated. In response to the stop trigger, the receiver 1122 enters into the standby mode from the transmission mode. Since the wireless signal sensing unit adopts a wireless signal sensor, power consumption of the wireless signal sensor is far less than power consumption of the receiver during working. Therefore, in this manner, the power consumption of the receiver 1122 of the device body 11 may be greatly reduced.

In an embodiment, as shown in FIGS. 7 and 8, the receiver 1122 transmits the demultiplexed digital signals of each channel to the down-sampler 1117 according to different channels, and the signals are down-sampled by the down-sampler 1117. The down-sampler 1117 respectively transmits, to the echo cancellation unit 1111, the signals of each channel obtained after down-sampling. The echo cancellation unit 1111 performs echo cancellation on each demultiplexed signal, to obtain the human voice signal of each channel after the echo cancellation, and inputs the signal to the speech enhancement unit 1120. The speech enhancement unit 1120 combines the human voice signals obtained by the echo cancellation unit 1111 upon completion of echo cancellation, to obtain an enhanced human voice signal. By performing echo cancellation on each signal, respectively, and then combining the human voice signals of each channel after echo cancellation, the human voice signals may be enhanced, and the quality of the collected human voice signal may be improved.

As shown in FIGS. 7 and 8, in an embodiment, when the microphone pickup unit 12 has a plurality of microphone units 1201, the delay determining unit 1110 may determine a time delay between the synchronizing signal and a second frequency band component in the mixed signal 25 collected by one of the plurality of microphone units 1201 and transmitted back to the device body 11 by the microphone pickup unit 12. The echo cancellation unit 1111 performs, by using the sound signal delayed according to the determined time delay, echo cancellation on the mixed signal 25 collected by all the microphone units 1201 and transmitted back to the device body 11 by the microphone pickup unit 12. In this embodiment, the filter 1116 may filter out a plurality of different second frequency band components for different channels (each channel corresponds to a microphone unit 1201), and transmit the second frequency band components to the delay determining unit 1110 to determine the time delay. In this case, the delay determining unit 1110 determines the time delay between the second frequency band component and the synchronizing signal when receiving a second frequency band component first, uses the determined time delay as the time delay between all the second frequency band components and the synchronizing signal, and transmits the time delay to the delay unit 118 for performing time delay on the sound signal, to obtain the sound signal after the time delay. Then, the sound signal after the time delay is input to the echo cancellation unit 1111, so that the echo cancellation unit 1111 performs echo cancellation on all channels. This embodiment is based on the assumption that the time delays of all channels are substantially the same. In this way, a second frequency band component received first may be used to quickly obtain a time delay and quickly be used for echo cancellation of all channels. The advantage is that the efficiency of the echo cancellation is improved.

As shown in FIGS. 7 and 8, in an embodiment, when the microphone pickup unit 12 has a plurality of microphone units 1201, the delay determining unit 1110 may respectively determine a respective time delay, that is, a time delay of each channel, between the synchronizing signal and each second frequency band component in the mixed signal 25 respectively collected by the plurality of microphone units 1201 and transmitted back to the device body 11 by the microphone pickup unit 12. Each channel corresponds to one microphone unit 1201. In other words, the delay determining unit 1110 respectively determines the time delay for each channel. The delay unit 1118 also respectively delays the sound signals cached in the first cache 1114 according to the determined time delay of each channel, to obtain a plurality of delayed sound signals. Then, the echo cancellation unit 1111 respectively performs echo cancellation on the output of each channel of the down-sampler 1117 by using the plurality of delayed sound signals. In other words, the echo cancellation unit 1111 respectively performs, by using the sound signal delayed according to the respective determined time delay, echo cancellation on the mixed signal 25 collected by a corresponding microphone unit 1201 and transmitted back to the device body 11 by the microphone pickup unit 12. This embodiment is based on the theory that although the time delays of all channels are generally the same, there are slight differences after all. In this way, the time delay of each channel may be determined, respectively, and the time delay of each channel is only used for echo cancellation on the corresponding channel, thereby improving the accuracy of echo cancellation.

In the schematic diagram as shown in FIG. 4A, there are a plurality of microphone pickup units 12, and there is only one device body 11. There are a plurality of receivers 1107 in the device body 11, which respectively correspond to the plurality of microphone pickup units 12. A corresponding meaning is that each receiver only receives, instead of receiving signals from other microphone pickup units 12, a signal sent by the microphone pickup unit 12 corresponding to the receiver, or discards the signal after receiving the signal.

In an embodiment, the receiver 1107 and the microphone pickup unit 12 corresponding to the receiver 1107 are connected by wire, so that the signal sent by the microphone pickup unit 12 may only be received by the corresponding receiver 1107 connected to the microphone pickup unit.

In another embodiment, the receiver 1107 communicates, in a wireless manner, with the microphone pickup unit 12 corresponding to the receiver 1107. Specifically, the microphone pickup unit 12 may adopt a broadcasting manner, but the broadcast signal includes a unique identifier of the microphone pickup unit 12. Different microphone pickup units 12 have different pickup unit identifiers. The signals broadcast by the microphone pickup units 12 have corresponding pickup unit identifiers. After the receiver 1107 receives the signal from the microphone pickup unit 12, it is determined whether the pickup unit identifier carried in the signal is the identifier of the microphone pickup unit 12 corresponding to the receiver 1107. If yes, the signal is retained. If not, the signal is discarded. This embodiment avoids messy wiring in the room as a result of wired wiring.

In the device body 11 shown in FIG. 6 to FIG. 8, a signal playback source 1108, a clock circuit 1112, a synchronizing signal generator 1109, an adder 1113, a horn 1101, a first cache 1114, a second cache 1115, a filter 1116, a delay determining unit 1110, a delay unit 1118, a delayed down-sampler 1119, an echo cancellation unit 1111, a down-sampler 1117, a speech enhancement unit 1120, a speech recognition unit 1121, and a control unit 1124. The above elements may be provided in a singular form (that is, only one of each of the above elements is provided). Since a plurality of receivers 1107 respectively receive signals and generate corresponding signal streams, and there is only one of the other components in the device body 11, other components in the device body 11 may process and generate output signals in sequential order in which the receivers receive the input signals. For example, the plurality of receivers 1107 send the received mixed signals 25 to the filter 1116, and the filter 1116 receives the mixed signals 25 in sequential order, which may filter out second frequency band components in the mixed signals according to the order in which the mixed signals 25 are input, and output the second frequency band components to the delay determining unit 1110. Since the delay determining unit 1110 receives the second frequency band components in different order, the delay determining unit also performs processing in the order of inputting the second frequency band components. The plurality of receivers 1107 further transmit the received mixed signals 25 to the down-sampler 1117. The down-sampler 1117 also receives the mixed signals 25 sent by the plurality of receivers 1107 in sequential order. In this way, the down-sampler 1117 successively performs down-sampling according to the sequential order in which the mixed signals 25 are received. In addition, as shown in FIGS. 7 and 8, in a case that the plurality of microphone units 1201 generate multi-channel signals, the signal sent by one receiver received by the down-sampler 1117 also includes a plurality of channels. The down-sampler 1117 receives multichannel signals in parallel, and sends the down-sampled signals to the echo cancellation unit 1111 in parallel after down-sampling.

In this embodiment, the delay determining unit 1110 may respectively determine a time delay (in the order of receiving the second frequency band components filtered out by the filter 1116) between a second frequency band component in the mixed signal 25 received by each receiver 1122 and the synchronizing signal. The delay unit 1118 delays the sound signals in the first cache 1114 according to the respective determined time delay. The echo cancellation unit 1111 performs, based on the mixed signal 25 received by each receiver, echo cancellation by using the sound signal delayed according to the corresponding determined time delay, to obtain the respective collected human voice signal. The echo cancellation unit 1111 still obtains a plurality of human voice signals. The speech enhancement unit 1120 may superimpose the plurality of human voice signals outputted by the echo cancellation unit 1111, thereby enhancing the human voice signals.

After the user utters the voice, since distances between the microphone pickup units 12 and the user are different, signal strength of the user speech signals received by the microphone pickup units is different. By placing the microphone pickup unit 12 at different positions in the room, the signals sent by each microphone pickup unit 12 are processed separately, and the processing results are combined, which facilitates improvement of accuracy of the human voice recognition result despite a long distance between the user and the microphone pickup unit 12 at a single position.

In the schematic diagram as shown in FIG. 4B, there are a plurality of microphone pickup units 12, and there is only one device body 11. There is also only one receiver 1107 in the device body 11, and therefore the receiver 1107 needs to correspond to all of the plurality of microphone pickup units 12.

In an embodiment, the receiver 1107 is connected to all of the microphone pickup units 12 in a wired manner. In another embodiment, the receiver 1107 communicates with all of the microphone pickup units 12 in a wireless manner. The receiver 1107 receives the signals sent by all of the microphone pickup units 12, and only one of the signals may be selected for processing according to predetermined criteria, while other mixed signals are discarded.

In an embodiment, the predetermined criterion is to retain the first received signal sent by the microphone pickup unit 12 for processing, and discard the signals sent by other microphone pickup units 12. Specifically, in an embodiment, the microphone pickup unit 12 has different pickup unit identifiers. The signals sent by the microphone pickup units 12 have corresponding pickup unit identifiers. If the receiver 1107 receives a signal with other pickup unit identifiers again after receiving a signal with a pickup unit identifier, the signal with other pickup unit identifiers is discarded. In other words, there is only one receiver 1107, which cannot simultaneously receive the signals sent by the plurality of microphone pickup units 12. Therefore, only the signal received earliest and sent by the microphone pickup unit 12 is retained. If signals with other pickup unit identifiers are further received, the signals will be discarded. According to this embodiment, it is assumed that the user speech picked up by each microphone pickup unit 12 will not differ greatly from each other, and only one of the earliest received signals sent by the microphone pickup unit 12 may be retained. Only the signal received earliest and sent by the microphone pickup unit 12 is processed, which facilitates an increase in the speed of echo cancellation.

In another embodiment, the predetermined criterion may be to select the signal closest to the user and sent by the microphone pickup unit 12, and discard the signals sent by other microphone pickup units 12. Selection is made in this way because a shorter distance between the microphone pickup unit 12 and the user leads to a larger volume of the collected human voice, which facilitates improvement of the human voice recognition effect. This may be implemented by adding a timestamp to the signal 25 when the microphone pickup unit 12 sends the signal 25. The time stamp indicates a time at which the microphone pickup unit 12 receives the user speech. In this way, the receiver 1107 may then select, in chronological order of the time indicated by the timestamp, the mixed signal 25 received at an earliest time indicated by the timestamp for processing. The quality of the user speech in the mixed signal 25 received at an earliest time indicated by the timestamp is the highest, which facilitates improvement of the speech recognition effect.

In this embodiment, the delay determining unit 1110 determines only the time delay between the received second frequency band component in the mixed signal 25 transmitted by the microphone pickup unit 12 and the synchronizing signal. The delay unit 1118 delays the sound signals in the first cache 1114 according to the determined time delay. The echo cancellation unit 1111 performs, based on the received mixed signal 25 transmitted by one microphone pickup unit 12, echo cancellation by using the sound signal delayed according to the determined time delay, to obtain the collected human voice signal.

In the schematic diagram shown in FIG. 4C, the device body 11 includes a horn 1101 and a receiver 1107 located locally, and a processing device 1103 located at a far end 1104. In the device body 11 shown in FIG. 6 to FIG. 8, the signal playback source 1108, the clock circuit 1112, the synchronizing signal generator 1109, the adder 1113, the first cache 1114, the second cache 1115, the filter 1116, the delay determining unit 1110, the delay unit 1118, the delayed down-sampler 1119, the echo cancellation unit 1111, the down-sampler 1117, the speech enhancement unit 1120, the speech recognition unit 1121, and the control unit 1124 are all located in the processing device 1103 at the far end 1104.

The processing device 1103 communicates with the local horn 1101 and receiver 1107 via the Internet or telecommunication connection. After a user utters speech, the microphone pickup unit 12 receives the user speech 24, and transmits the user speech 24, an echo 22 of a sound played by the horn, and interference noise 23 in the environment together to the local receiver 1107 as a mixed signal 25. The local receiver 1107 sends the received mixed signal to the processing device 1103 at the far end 1104 via the Internet or telecommunication connection. The processing device 1103 removes, according to the process with reference to FIG. 5 to FIG. 8 in the foregoing embodiments, the echo of the sound played by the horn and the interference noise in the environment from the received mixed signal 25, to obtain a human voice signal, generates a control command according to the human voice signal, such as "turn up or turn down the volume", and transmits the control command to the horn 1101 via the Internet or telecommunication connection, thereby controlling the playing volume of the horn 1101. The advantage of this embodiment is that the processing device 1103 that does not need to collect signals is moved from the local to the far end, which reduces occupation of the local space while making network centralized processing possible.

In the schematic diagram shown in FIG. 4D, the processing device 1103 located at the far end 1104 communicates with the horns 1101 and receivers 1107 at a plurality of locations 2, and processes the mixed signals 25 sent to the receivers 1107 by the microphone pickup units 12 at the plurality of locations 2. In other words, the processing device 1103 at the far end 1104 may respectively constitute a device body 11 with the horns 1101 and the receivers 1107 at the plurality of locations.

After a user utters speech, the local microphone pickup unit 12 receives the user speech 24, and transmits the user speech 24, the echo 22 of a sound played by the horn, and the interference noise 23 in the environment together to the receiver 1107 as the mixed signal 25. The receiver 1107 sends the received mixed signal 25 to the processing device 1103 at the far end 1104 via the Internet or telecommunication connection. The processing device 1103 removes, according to the process with reference to FIG. 5 to FIG. 8 in the foregoing embodiments, the echo of the sound played by the horn and the interference noise in the environment from the received mixed signal 25, to obtain a human voice signal, generates a control command according to the human voice signal, and transmits the control command to the horn 1101 via the Internet or telecommunication connection, thereby controlling the playing volume of the horn 1101. This embodiment has advantages in that mixed signals 25 reported by each receiver 1107 are uniformly processed by the same processing device 1103 so that centralized processing is implemented, which facilitates effective use of resources, reducing occupation of local resources.

In the schematic diagram shown in FIG. 4E, a far end may be provided with a plurality of processing devices 1103 and a scheduling module 1105. The scheduling module 1105 is connected to a plurality of processing devices 1103. Each local receiver 1107 communicates, through the scheduling module 1105, with the plurality of processing devices 1103 located at the far end. The receiver 1107 transmits the mixed signal 25 to the scheduling module 1105 via the Internet or telecommunication connection when receiving the mixed signal 25 sent by the local microphone pickup unit 12, and the scheduling module 1105 specifies a processing device 1103 that processes the mixed signal 25. The specific processing process is described with reference to FIG. 5 to FIG. 8 in the foregoing embodiment.

The advantage of the process is that the combination of the processing device 1103, the horn 1101, and the receiver 1107 is not fixed. When the mixed signal 25 sent by the local receiver 1107 is received, a processing device 1103 to be assigned is determined by the scheduling module 1105 according to the current load of each processing device 1103, so that the processing load of each processing device 1103 may be balanced, and network resources may be effectively allocated.

In an embodiment, the scheduling module 1105 specifies, based on a number of tasks currently being processed by each processing device 1103, the processing device 1103 that processes the mixed signal 25 received by the receiver 1107. A task is a process of processing the signal sent by a receiver 1107 assigned by the scheduling module 1105 to obtain the collected human voice signal.

After a user utters speech, the local microphone pickup unit 12 receives the user speech 24, and transmits the user speech 24, the echo 22 of a sound played by the horn, and the interference noise 23 in the environment together to the receiver 1107 as the mixed signal 25. The receiver 1107 sends the received mixed signal 25 to the scheduling module 1105 at the far end 1104 via the Internet or telecommunication connection. The scheduling module 1105 assigns a processing device 1103 to the mixed signal 25 according to the number of tasks currently being processed by each processing device 1103. The assigned processing device 1103 processes the mixed signal 25 according to the process with reference to FIG. 5 to FIG. 8 in the foregoing embodiments, removes the echo of the sound played by the horn and the interference noise in the environment from the received mixed signal 25, to obtain a human voice signal, generates a control command according to the human voice signal, and transmits the control command to the horn 1101 via the Internet or telecommunication connection through the scheduling module 1105, thereby controlling the playing volume of the horn 1101.

When the scheduling module 1105 assigns a processing device 1103 to process the mixed signal 25, it may be considered that a task starts. The control command generated according to the human voice signal is sent to the horn 1101 via the Internet or telecommunication connection through the scheduling module 1105. In this way, the scheduling module 1105 receives a control command, which means completion of the corresponding task. If a task starts, that is, a processing device 1103 is assigned, but the control command returned by the processing device 1103 is not received, it is considered that the processing device 1103 is currently processing the task. In this way, the scheduling module 1105 may assign a processing device 1103 to the mixed signal according to the number of tasks currently being processed by each processing device 1103. For example, the received mixed signal 25 is allocated to the processing device 1103 with the least number of tasks currently being processed.

More specifically, in an embodiment, when a processing device 1103 is assigned and the mixed signal 25 is sent to the processing device 1103 for processing, a task identifier (ID) may be added to the mixed signal 25, and the processing device 1103 is required to add the task ID to the corresponding control command when returning the corresponding control command. In this way, after adding a task ID to the mixed signal 25 and sending the mixed signal to the processing device 1103, it may be determined, depending on whether the control command including the task ID is received from the processing device 1103, whether the processing device 1103 is currently processing the task.

The foregoing embodiment of specifying, according to the number of tasks currently being processed by each processing device 1103, the processing device 1103 that processes the mixed signal 25 has the advantage that the processing device 1103 may be flexibly allocated based on the current processing load of each processing device 1103, which facilitates load balance of each processing device, thereby improving the efficiency of comprehensive utilization of resources.

Figure 9:
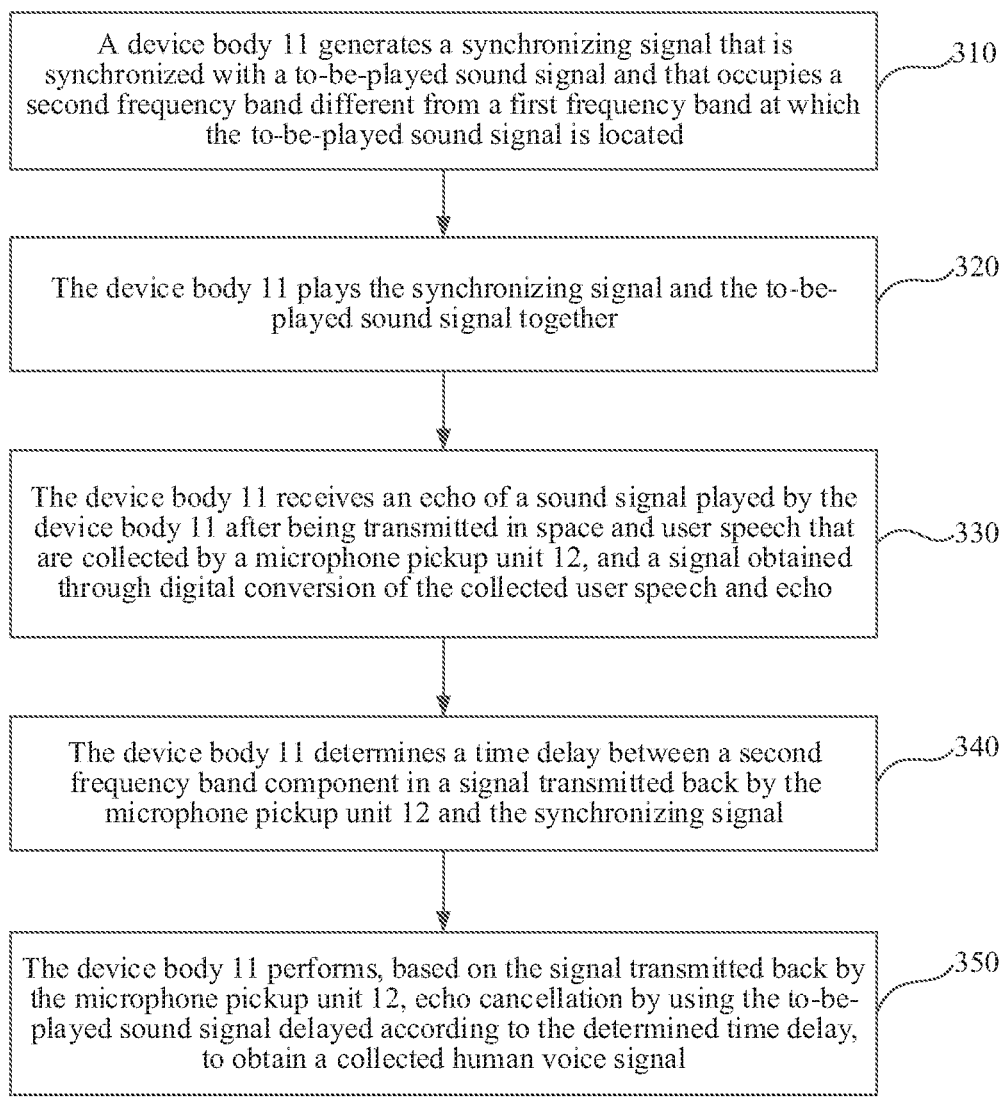
FIG. 9 is a flowchart of a method for collecting a human voice signal in a far-field pickup device according to an embodiment of the disclosure.

As shown in FIG. 9, according to an embodiment of the disclosure, a method for collecting a human voice signal in a far-field pickup device is further provided. As described above, the far-field pickup device 1 includes a device body 11 with separate components and a microphone pickup unit 12. The method includes the following operations.

Operation 310: The device body 11 generates a synchronizing signal that is synchronized with a sound signal and that occupies a second frequency band different from a first frequency band at which the sound signal is located.

Operation 320: The device body 11 plays the synchronizing signal and the sound signal together.

Operation 330: The device body 11 receives an echo of a sound signal played by the device body 1 after being transmitted in space and user speech that are collected by the microphone pickup unit 12, and a signal obtained through digital conversion of the collected user speech and echo.

Operation 340: The device body 11 determines a time delay between a second frequency band component in a signal transmitted back by the microphone pickup unit 12 and the synchronizing signal.

Operation 350: The device body 11 performs, based on the signal transmitted back by the microphone pickup unit 12, echo cancellation by using the sound signal delayed according to the determined time delay, to obtain a collected human voice signal.

In an embodiment, before operation 350, the method further includes: delaying, by the device body 11, the sound signal delayed by using the time delay determined in operation 340, to perform echo cancellation.

In an embodiment, before operation 340, the method further includes: filtering out, by the device body 11, a second frequency band component from the signal transmitted back by the microphone pickup unit 12, to determine the time delay.

In an embodiment, before operation 350, the method further includes: converting, by the device body 11, into a sampling frequency used for human voice recognition from a sampling frequency used for playing the sound signal, a sampling frequency of the signal transmitted back by the microphone pickup unit 12, to perform echo cancellation.

In an embodiment, before operation 340, the method further includes: receiving, by the device body 11, a signal transmitted back by the microphone pickup unit 12.

In an embodiment, the microphone pickup unit 12 has a transmitter 1204 configured to transmit, to the device body 11, the collected user speech and the echo of the sound signal played by the device body after being transmitted in space. The transmitter 1204 has a standby mode and a transmission mode, the transmitter 1204 being out of operation in the standby mode, and the transmitter 1204 being switched to the transmission mode from the standby mode in a case that the user speech is recognized from the collected sound signal.

In an embodiment, the microphone pickup unit 12 has a microphone unit 1201, a human voice recognition unit 1203, and a cache unit 1202. The microphone unit 1201 is configured to collect the user speech and the echo of the sound signal played by the device body after being transmitted in space. The cache unit 1202 is configured to cache the user speech and the echo collected by the microphone unit 1201. The human voice recognition unit 1203 is configured to recognize a human voice from output of the microphone unit 1201, trigger, in a case that the human voice is recognized, the transmitter 1204 to enter into the transmission mode, and transmit the user speech and the echo cached by the cache unit 1202.

In an embodiment, there are a plurality of microphone units 1201. One of the microphone units 1201 is connected to the human voice recognition unit 1203, and the human voice recognition unit 1203 triggers, in a case that a human voice is detected from the output of the connected microphone unit 1201, the transmitter 1204 to enter into the transmission mode, and transmits the user speech and the echo collected by each of the microphone units 1201 and cached by the cache unit 1202.

In an embodiment, the user speech and the echo cached by the cache unit 1202 and collected by each of the microphone units 1201 are multiplexed before being transmitted.

In an embodiment, before operation 340, the method includes: demultiplexing, by the device body 11, the multiplexed user speech and echo collected by each of the microphone units 1201.

In an embodiment, operation 350 includes: respectively performing, by the device body 11, echo cancellation unit on the demultiplexed user speech collected by each of the microphone units 1201.

In an embodiment, after operation 350, the method further includes: respectively performing, by the device body 11, echo cancellation on the demultiplexed user speech collected by each of the microphone units 1201, and combining the obtained human voice signals, to obtain an enhanced human voice signal.

In an embodiment, after operation 350, the method further includes: performing, by the device body 11, speech recognition on the collected human voice signal.

In an embodiment, after the speech recognition is performed on the collected human voice signal, the method further includes:

performing a control action based on a control command in a speech recognition result.

In an embodiment, the device body 11 has a receiver 1122, the receiver 1122 having a standby mode and a receiving mode. The receiver 1122 does not operate in the standby mode, and the receiver 1122 is switched to the receiving mode from the standby mode in a case that a wireless signal is sensed.

In an embodiment, the receiver 1122 has a wireless signal sensing unit 1123, and when the wireless signal sensing unit 1123 senses a wireless signal, the receiver 1122 enters into the receiving mode from the standby mode.

In an embodiment, a period during which the cache unit 1202 caches the user speech and the echo collected by the microphone unit 1201 is at least not less than a recognition delay of the human voice recognition unit 1203.

In an embodiment, there are a plurality of microphone units 1201. The human voice recognition unit 1203 is connected to each of the microphone units 1201, triggers, in a case that a human voice is detected from the output of any one of the connected microphone units 1201, the transmitter 1204 to enter into the transmission mode, and transmits the user speech and the echo collected by each of the microphone units 1201 and cached by the cache unit 1202.

In an embodiment, the second frequency band is an ultrasonic frequency band.

In an embodiment, a sampling frequency of the microphone unit 1201 is consistent with sampling frequencies of the sound signal and the synchronizing signal, and is greater than or equal to 2 times of the highest frequency of the synchronizing signal.

In an embodiment, the synchronizing signal is a pseudo-random sequence after carrier modulation.

In an embodiment, the pseudo-random sequence is selected based on at least one of the following:
an autocorrelation function of a pseudo-random sequence;
a period of the pseudo-random sequence; and
a spectral width of the autocorrelation function of the pseudo-random sequence.

In addition, the frequency of a carrier may be selected based on a distance of 20 KHz.

In an embodiment, before operation 320, the method further includes: caching, by the device body 11, the sound signal for echo cancellation, and caching the synchronizing signal for determining a time delay.

In an embodiment, a duration for which the synchronizing signal or the sound signal is cached is at least a sum of a duration for which the played sound signal is transmitted to the microphone pickup unit 12 and a duration for which the sound signal outputted by the microphone pickup unit 12 is transmitted back to the device body.

In an embodiment, operation 340 includes: determining a time corresponding to a maximum value of a cross-correlation function between a second frequency band component in a signal transmitted back by the microphone pickup unit 12 and the synchronizing signal; and using, as the time delay, a sum of the determined time and a delay caused by the filter.

In an embodiment, when the microphone pickup unit 12 has a plurality of microphone units 1201, operation 340 includes: respectively determining a respective time delay between the synchronizing signal and second frequency band components in the signals transmitted back to the device body 11 by the microphone pickup unit 12 and collected by the plurality of microphone units 1201. Operation 350 includes: respectively performing, by using the sound signal delayed according to the respective determined time delay, echo cancellation on the signal collected by a corresponding microphone unit 1201 and transmitted back to the device body 11 by the microphone pickup unit 12.

In an embodiment, when the microphone pickup unit 12 has a plurality of microphone units 1201, operation 340 includes: determining a time delay between the synchronizing signal and a second frequency band component in the signal transmitted back to the device body 11 by the microphone pickup unit 12 and collected by one of the plurality of microphone units 1201. Operation 350 includes: performing, by using the sound signal delayed according to the determined time delay, echo cancellation on the signal collected by all of the microphone units 1201 and transmitted back to the device body 11 by the microphone pickup unit 12.

In an embodiment, there are a plurality of microphone pickup units 12, and there is only one device body 11. There are a plurality of receivers 1122 in the device body 11, which respectively correspond to the plurality of microphone pickup units 12. Operation 340 includes: respectively determining a time delay between a second frequency band component in a signal received by each receiver 1122 and the synchronizing signal. Operation 350 includes: performing, based on the signal received by each receiver 1122, echo cancellation by using the sound signal delayed according to the corresponding determined time delay, to obtain the respective collected human voice signal.

In an embodiment, the microphone pickup units 12 have different pickup unit identifiers, and the signal sent by the microphone pickup unit 12 has a corresponding pickup unit identifier. After the receiver 1122 receives the signal, the received signal with the pickup unit identifier corresponding to the receiver 1122 is retained, while the received signal without the pickup unit identifier corresponding to the receiver 1122 is discarded.

In an embodiment, there are a plurality of microphone pickup units 12, and there is only one device body 11. The device body 11 also has only one receiver 1122. If the receiver 1122 further receives signals sent by other microphone pickup units 12 after receiving a signal sent by a microphone pickup unit 12, the signals sent by the other microphone pickup units 12 are discarded. Operation 340 includes: determining a time delay between the received second frequency band component in a signal transmitted by one microphone pickup unit 12 and the synchronizing signal. Operation 350 includes: performing, based on the received signal transmitted by one microphone pickup unit 12, echo cancellation by using the sound signal delayed according to the determined time delay, to obtain the collected human voice signal.

In an embodiment, the microphone pickup units 12 have different pickup unit identifiers, and the signal sent by the microphone pickup unit 12 has a corresponding pickup unit identifier. If the receiver 1122 further receives signals with other pickup unit identifiers again after receiving a signal with a pickup unit identifier, the signals with other pickup unit identifiers are discarded.

In an embodiment, the device body 11 includes a horn 1101 and a receiver 1107 located locally, and a processing device 1103 located at a far end. Operations 310, 340, and 350 are all performed by the processing device 1103.

In an embodiment, the processing device 1103 located at the far end communicates with the horns 1101 and receivers 1107 at a plurality of locations, and processes the signals sent to the receivers 1122 by the microphone pickup units 12 at the plurality of locations.

In an embodiment, the receiver 1122 communicates with a plurality of processing devices 1103 located at the far end through a scheduling module 1105. When the receiver 1122 receives the signal sent by the local microphone pickup unit 12, the scheduling module 1105 specifies the processing device 1103 that processes the signal received by the receiver 1107.

In an embodiment, the scheduling module 1105 specifies, based on a number of tasks currently being processed by each processing device 1103, the processing device 1103 that processes the signal received by the receiver 1122. A task is a process of processing the signal sent by a receiver 1122 assigned by the scheduling module 1105 to obtain the collected human voice signal.

Since the detailed description of the method embodiment with reference to FIG. 9 has been involved in the detailed description of the far-field pickup device 1, and the detailed description of the far-field pickup device 1 is completely applicable to this part, details are not described herein again.

In addition, although the various operations of the method in the disclosure are described in a specific order in the accompanying drawings, this does not require or imply that the operations are bound to be performed in the specific order, or all the operations shown are bound to be performed to achieve the desired result. Additionally or alternatively, certain operations may be omitted, a plurality of operations may be combined into one operation for execution, and/or one operation may be decomposed into a plurality of operations for execution, and the like.

Figure 10:
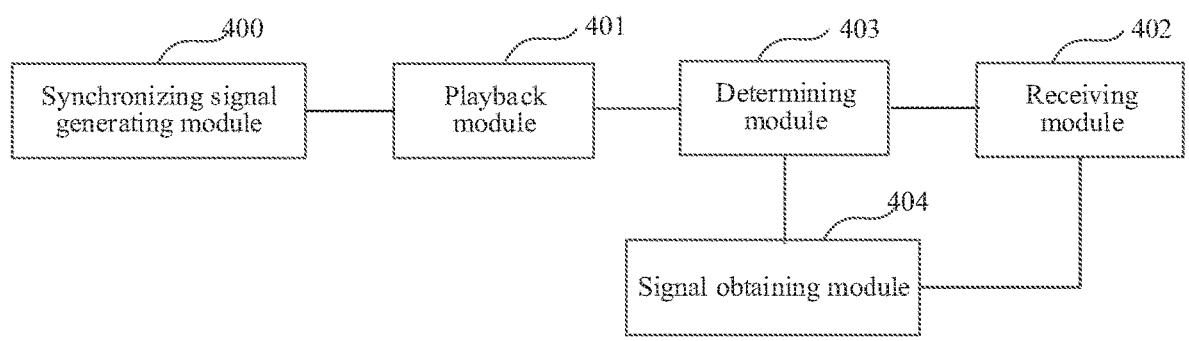
FIG. 10 shows an apparatus for collecting a human voice signal in a far-field pickup device according to an embodiment of the disclosure.

FIG. 10 shows an apparatus for collecting a human voice signal in a far-field pickup device according to an embodiment of the disclosure. As shown in FIG. 10, the apparatus includes:

a synchronizing signal generating module 400 configured to generate a synchronizing signal that is synchronized with a sound signal and occupies a second frequency band different from a first frequency band at which the sound signal is located;

a playback module 401 configured to play the synchronizing signal and the sound signal together;

a receiving module 402 configured to receive an echo of a sound signal played by the device body after being transmitted in space and user speech that are collected by a microphone pickup unit, and a signal obtained through digital conversion of the collected user speech and echo;

a determining module 403 configured to determine a time delay between a second frequency band component in a signal transmitted back by the microphone pickup unit and the synchronizing signal; and a signal obtaining module 404 configured to perform, based on the signal transmitted back by the microphone pickup unit, echo cancellation by using the sound signal delayed according to the determined time delay, to obtain the collected human voice signal.

Figure 11:
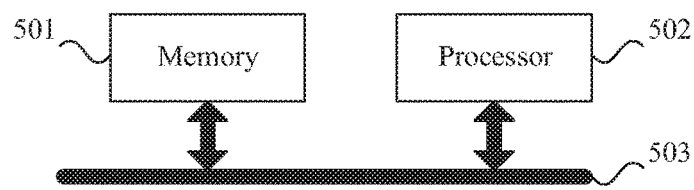
FIG. 11 shows an electronic device for implementing a method for collecting a human voice signal in a far-field pickup device according to embodiment of the disclosure.

FIG. 11 shows an electronic device for implementing a method for collecting a human voice signal in a far-field pickup device according to an embodiment of the disclosure. As shown in FIG. 11, the electronic device includes: at least one processor 501 and at least one memory 502, the memory 502 storing a computer-readable program instruction, the computer-readable program instruction, when executed by the processor 501, causing the processor 501 to perform the operation of the method for collecting a human voice signal in a far-field pickup device in the foregoing embodiment.

In the embodiments of the disclosure, the memory 501 may mainly include a program storage area and a data storage area. The program storage area may store an operating system, an application program required by at least one function, and the like. The data storage area may store data created during method execution. The processor 502 may be a central processing unit (CPU), a digital processing unit, or the like.

In FIG. 11, the memory 501 is connected to the processor by using a bus 503, and the bus 503 is represented by a thick line in FIG. 11. The bus 503 may be classified into an address bus, a data bus, a control bus, and the like. For ease of representation, only one thick line is used to represent the bus in FIG. 11, but this does not mean that there is only one bus or only one type of bus.

The memory 501 may be a volatile memory such as a random-access memory (RAM). Alternatively, the memory 501 may be a non-volatile memory such as a read-only memory, a flash memory, a hard disk drive (HDD), or a solid-state drive (SSD). Alternatively, the memory 501 is any other medium that may be used to carry or store expected program code that has an instruction or data structure form and that may be accessed by a computer, but is not limited thereto. The memory 501 may be a combination of the foregoing memories.

The embodiments of the disclosure further provide a computer-readable storage medium, storing a computer-readable program instruction executable by an electronic device, the computer-readable program instruction, when run on the electronic device, causing the electronic device to perform the operations of the method for collecting a human voice signal in the far-field pickup device.

In the embodiments of the disclosure, a synchronizing signal generator is configured to generate a synchronizing signal that is synchronized with a to-be-played sound signal and that occupies a second frequency band different from a first frequency band at which the to-be-played sound signal is located. The synchronizing signal is played together with the to-be-played sound signal. Because the synchronizing signal has a frequency band different from the frequency band of the to-be-played sound signal, in a case that the microphone pickup unit collects the user speech and the sound signal played by the device body and transmits back, to the device body, the user speech and the sound signal that are digitally converted, the device body may easily filter out a component of the second frequency band to be compared with the generated synchronizing signal in time, to determine a time delay. Since the synchronizing signal is played together with the to-be-played sound signal, the time delay is also the time delay between the generating of the to-be-played sound signal and the receiving, by the device body, of the echo of the to-be-played sound signal transmitted back again by the microphone pickup unit. The to-be-played sound signal is delayed according to the time delay, and echo cancellation is performed by using the to-be-played sound signal delayed according to the determined time delay. Therefore, the problem that a microphone signal and an echo reference signal cannot be synchronized in the related art is resolved, and speech recognition performance may be improved.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

While the disclosure has been particularly shown and described with reference to example embodiments thereof, it will be understood that various changes in form and details may be made therein without departing from the spirit and scope of the following claims.

What is claimed is:

1. A far-field pickup device, comprising:
    a device body; and
    a microphone configured to collect user speech and an echo of a first sound signal output by the device body, and the microphone further configured to transmit, to the device body, the collected user speech and the echo, the device body comprising:
        a signal playback source configured to generate a second sound signal, the second sound signal having a frequency in a first frequency band;
        a synchronizing signal processor, implemented by at least one processor, configured to generate a synchronizing signal that is synchronized with the second sound signal, the synchronizing signal having a frequency in a second frequency band, wherein the second frequency band is different from the first frequency band;
        a speaker configured to output a signal obtained by superimposing the second sound signal with the synchronizing signal, the signal output by the speaker corresponding to the first sound signal;
        a delay determining processor, implemented by the at least one processor, configured to determine a time delay between a second frequency band component in the collected user speech and the echo and the synchronizing signal; and
        an echo cancellation processor, implemented by the at least one processor, configured to obtain a collected human voice signal by performing echo cancellation on the collected user speech and the echo using a delayed second sound signal.

2. The far-field pickup device according to claim 1, wherein the device body further comprises:
    a delay processor, implemented by the at least one processor, configured to generate the delayed second sound signal, wherein the delayed second sound signal comprises the second sound signal delayed according to the time delay.

3. The far-field pickup device according to claim 1, wherein the device body further comprises:
    a filter configured to:
        filter out the second frequency band component from the collected user speech and the echo, and
        output the filtered second frequency band component to the delay determining processor.

4. The far-field pickup device according to claim 1, wherein the device body further comprises:
    a down-sampler configured to convert, into a sampling frequency for human voice recognition, a sampling frequency of the collected user speech and the echo, and output the sampling frequency for human voice recognition to the echo cancellation processor.

5. The far-field pickup device according to claim 1, wherein the device body further comprises:
    a receiver configured to receive the collected user speech and the echo.

6. The far-field pickup device according to claim 5, wherein the microphone comprises a transmitter and the microphone is further configured to:
    in response to the user speech being recognized from the collected user speech, switching the transmitter from a standby mode to a transmission mode; and
    in a transmission mode, transmit, to the device body, the collected user speech and the echo of the first sound signal output by the device body.

7. The far-field pickup device according to claim 6, wherein the microphone further comprises a human voice recognition processor, and a cache, wherein:
    the cache is configured to cache the collected user speech and the echo, and
    the human voice recognition processor configured to, in response to recognizing a human voice from an output of the microphone, trigger the transmitter to transmit the user speech and the echo cached by the cache to the device body.

8. The far-field pickup device according to claim 7, wherein the microphone comprises a plurality of microphones, and wherein the human voice recognition processor is further configured to, in response to recognizing the human voice from an output of the plurality of microphones, trigger the transmitter to transmit the user speech and the echo collected by each of the plurality of microphones and cached by the cache to the device body.

9. The far-field pickup device according to claim 8, wherein the echo cancellation processor is further configured to perform the echo cancellation on the user speech collected by each of the plurality of microphones and received by the receiver, and
    wherein the device body further comprises a speech enhancement processor, implemented by the at least one processor, and configured to combine human voice signals obtained by performing the echo cancellation on the user speech collected by each of the plurality of microphones, to obtain an enhanced human voice signal.

10. The far-field pickup device according to claim 5, wherein the receiver is further configured to switch from a standby mode to a receiving mode to receive the signal transmitted by the microphone in response to sensing of a wireless signal.

11. The far-field pickup device according to claim 1, wherein the second frequency band is an ultrasonic frequency band, and the synchronizing signal is a pseudo-random sequence obtained after carrier modulation.

12. The far-field pickup device according to claim 1, wherein the device body further comprises:
    a first cache configured to cache the second sound signal generated by the signal playback source and used in the echo cancellation by the echo cancellation processor; and a second cache configured to cache the synchronizing signal generated by the synchronizing signal processor and used in determining the time delay by the delay determining processor.

13. The far-field pickup device according to claim 3, wherein the delay determining processor is further configured to:
   determine a time corresponding to a maximum value of a cross-correlation function between the second frequency band component in the collected user speech and the echo and the synchronizing signal; and
   determine, as the time delay, a sum of the determined time and a delay caused by the filter.

14. The far-field pickup device according to claim 5, wherein the device body further comprises a processing device that is remotely located, and
   wherein the signal playback source, the synchronizing signal processor, the delay determining processor, and the echo cancellation processor are located in the processing device.

15. A method for collecting a human voice signal in a far-field pickup device, the far-field pickup device comprising a device body and a microphone, the method comprising:
   generating, by the device body, a synchronizing signal that is synchronized with a first sound signal, the first sound signal having a frequency in a first frequency band, the synchronizing signal having a frequency in a second frequency band, wherein the second frequency band is different from the first frequency band;
   outputting, by the device body, a second sound signal based on the synchronizing signal and the first sound signal;
   receiving, by the device body, an echo of the second sound signal output by the device body and user speech that are collected by the microphone, and a signal based on the collected user speech and the echo;
   determining, by the device body, a time delay between a second frequency band component in the signal based on the collected user speech and the echo and the synchronizing signal; and
   performing, by the device body, echo cancellation on the signal based on the collected user speech and the echo to obtain a collected human voice signal, by using the first sound signal delayed according to the time delay.

16. The method according to claim 15, wherein the determining the time delay comprises:
   filtering out, by using a filter of the device body, the second frequency band component from the signal based on the collected user speech and the echo to determine the time delay.

17. The method according to claim 15, wherein the performing the echo cancellation comprises:
   converting, by the device body, into a sampling frequency used for human voice recognition from a sampling frequency in which the first sound signal is output, to perform the echo cancellation.

18. The method according to claim 16, wherein the determining the time delay comprises:
   determining, by the device body, a time corresponding to a maximum value of a cross-correlation function between the second frequency band component in the signal based on the collected user speech and the echo and the synchronizing signal; and
   determining, as the time delay, a sum of the determined time and a delay caused by the filter.

19. The method according to claim 15, wherein the microphone comprises a plurality of microphones configured to collect the user speech, and the performing the echo cancellation comprises:
   respectively performing, by the device body, the echo cancellation on received user speech collected by each of the plurality of microphones, and combining human voice signals obtained by respectively performing the echo cancellation on the user speech collected by each of the plurality of microphones, to obtain an enhanced human voice signal.

20. An apparatus for collecting a human voice signal in a far-field pickup device, comprising:
   at least one memory configured to store program code; and
   at least one processor configured to read the program code and operate as instructed by the program code, the program code comprising:
      synchronizing signal generating code configured to cause at least one of the at least one processor to generate a synchronizing signal that is synchronized with a first sound signal, the first sound signal having a frequency in a first frequency band, the synchronizing signal having a frequency in a second frequency band, wherein the second frequency band is different from the first frequency band;
      playback code configured to cause at least one of the at least one processor to output the synchronizing signal and the first sound signal;
      receiving code configured to cause at least one of the at least one processor to receive an echo of a second sound signal output by a device body of the far-field pickup device and user speech that are collected by a microphone, and a signal based on the collected user speech and the echo;
      determining code configured to cause at least one of the at least one processor to determine a time delay between a second frequency band component in the based on the collected user speech and the echo and the synchronizing signal; and
      signal obtaining code configured to cause at least one of the at least one processor to perform echo cancellation on the signal based on the collected user speech and the echo to obtain a collected human voice signal, by using the first sound signal delayed according to the time delay.

* * * * *